(12) United States Patent
Kezys

(10) Patent No.: US 6,492,942 B1
(45) Date of Patent: Dec. 10, 2002

(54) CONTENT-BASED ADAPTIVE PARASITIC ARRAY ANTENNA SYSTEM

(75) Inventor: Vytas Kezys, Ancaster (CA)

(73) Assignee: COM DEV International, Inc., Cambridge (CA)

( * ) Notice: Subject to any disclaimer, the term of this patent is extended or adjusted under 35 U.S.C. 154(b) by 0 days.

(21) Appl. No.: 09/707,855

(22) Filed: Nov. 7, 2000

Related U.S. Application Data

(60) Provisional application No. 60/164,397, filed on Nov. 9, 1999.

(51) Int. Cl.[7] .............................. H01Q 3/22; H01Q 3/26

(52) U.S. Cl. ...................................... 342/368; 342/372

(58) Field of Search ................................. 342/368, 383, 342/372, 377

(56) References Cited

U.S. PATENT DOCUMENTS

| 3,560,978 A | | 2/1971 | Himmel et al. |
| 3,725,938 A | * | 4/1973 | Black et al. ................. 343/833 |
| 4,604,628 A | | 8/1986 | Cox |
| 4,639,914 A | | 1/1987 | Winters |

(List continued on next page.)

FOREIGN PATENT DOCUMENTS

| DE | 2417653 | 10/1974 |
| DE | 2523919 | 12/1975 |
| DE | 3150235 | 6/1983 |
| DE | 3223598 | 5/1991 |
| EP | 0568507 | 11/1993 |
| EP | 0812026 | 12/1997 |
| WO | 9428595 | 12/1994 |

OTHER PUBLICATIONS

Vaughan, Rodney, "Swithced Parasitic Elements for Antenna Diversity", IEEE Trans. on Antennas and Propagation, vol. 47, N 2, 2/99, pp. 399–405.*

Scott, N. L. et al, "Diversity Gain from a Single–Port Adaptive Antenna Using Switched Parasitic Elements Illustrated with a Wir and Monopole Prototype", IEEE Trans. On Antennas and Propagation, vol. 47, No. 6, 6/99, pp. 1066–1070.*

Adachi, Fumiyuki et al., "Wideband DS–CDMA for Next-Generation Mobile Communications Systems," IEEE Communications Magazine, pp. 56–69 (eptember 1998).

Scott, Neil L., et al., "Diversity Gain from a Single–Port Adaptive Antenna Using Switched Parasitic Elements Illustrated with a Wire and Monopole Prototype," IEEE Transactions on Antennas and Propagation, vol. 47, No. 6, pp. 1066–1070 (Jun. 1999).

*Primary Examiner*—Gregory C. Issing
(74) *Attorney, Agent, or Firm*—Jones, Day, Reavis & Pogue

(57) ABSTRACT

An adaptive parasitic array antenna system having properties of directive gain, self-pointing and interference rejection is provided including an adaptive parasitic array antenna comprising at least one active element and one or more parasitic elements coupled to controlled impedances (CI). The system further comprises a transceiver, a content-based optimization criterion computation module (CBOCCM), and a control variable optimizer (CVO). The CBOCCM receives a signal waveform from the active element through the transceiver, and computes an optimization criterion (OC) based on the content of the received signal. The optimization criterion is coupled to the CVO, which adaptively computes one or more control variables (CV), which are coupled to the controlled impedances CI in order to adjust the beampattern created by the adaptive parasitic array antenna. Also disclosed are two preferred adaptation implementations and algorithms, a pilot-tone based adaptation system, and a decision-directed based adaptation system.

111 Claims, 11 Drawing Sheets

U.S. PATENT DOCUMENTS

| | | | |
|---|---|---|---|
| 4,700,197 A | * 10/1987 | Milne | 343/837 |
| H375 H | 11/1987 | Dinger | |
| 4,710,775 A | 12/1987 | Coe | |
| 4,937,584 A | 6/1990 | Gabriel et al. | |
| 5,243,358 A | 9/1993 | Sanford et al. | |
| 5,294,939 A | 3/1994 | Sanford et al. | |
| 5,642,353 A | 6/1997 | Roy, III et al. | |
| 5,675,343 A | 10/1997 | Champeau | |
| 5,767,807 A | * 6/1998 | Pritchett | 342/374 |
| 5,914,695 A | 6/1999 | Liu et al. | |
| 6,049,310 A | * 4/2000 | Sadahiro | 343/702 |
| H26 H | * 2/1986 | Dinger | 342/372 |

* cited by examiner

CONTENT-BASED ADAPTIVE PARASITIC ARRAY ANTENNA SYSTEM

CROSS-REFERENCE TO RELATED APPLICATIONS

This application is related to, and claims priority from, co-pending U.S. Provisional Patent Application No. 60/164,397 filed on Nov. 9, 1999.

BACKGROUND

1. Technical Field

The present invention is directed to the field of antenna systems for communication networks. More specifically, the invention provides an adaptive array antenna including at least one active element and one or more parasitic elements, in which the electrical loading of the parasitic elements is dynamically adapted based upon the content of the received radio frequency signal at the active element in order to optimize the antenna beam pattern. Antenna systems according to the present invention are particularly well-suited for use in high multi-path environments, such as within a cellular communication network in an urban area.

2. Description of the Related Art

Antenna pattern control (or beamforming) using antenna arrays has been implemented in may different forms for applications including wireless communications and radar. These include phased-array antennas, Butler matrices, non-adaptive analog and digital beamformers, switched beam antennas and fully-adaptive smart antennas.

Examples of fully-adaptive smart antennas, which are array antennas in which each of the antenna elements is an "active" element, are shown in U.S. Pat. Nos. 4,639,914, 5,642,353, and in documentation for a publicly available system called "IntelliCell" from ArrayComm. These fully-adaptive antennas require active circuitry, i.e., a transmitter/receiver (TX/RX), on each of the antenna elements, and typically perform digital beamforming. The use of multiple transceivers (TX/RX) and digital beamforming dramatically increases the cost and complexity of these types of antenna systems, however, and thus limits their usefulness to those situations in which cost is not a key driver.

Parasitic array antennas include one or more active (or driven) elements and a plurality of parasitic elements. The active element is connected to a transceiver, but the parasitic elements are not. The electrical loading on the parasitic elements effect the radio frequency electromagnetic coupling between the parasitics and the active element(s), and hence the antenna beam pattern. Examples of parasitic array antennas include U.S. Pat. Nos. 4,700,197, 5,294,939, and 5,767,807. The antenna systems shown in these patents, however, do not provide a means for adaptively controlling the parasitic elements in order to match the electromagnetic to environment in which the antenna system is operating. Thus, these antennas are not suitable for use in environments that include a high degree of multi-path, such as in an urban environment.

In U.S. Statutory Invention Registration H26 and H375, an adaptive parasitic array antenna is disclosed. In this antenna system, the power level of the received signal at the active element is used to adaptively steer the beam pattern towards the highest received power level by adjusting the reactance (or loading) on the parasitic elements. Although such an antenna system may be useful for line-of-sight communications, such as in a missile tracking antenna system as disclosed in H26 and H375, it will not operate effectively in a high multi-path environment. In high multipath environments, the signal from a particular source (whether desired or interference) travels over many different paths due to scattering. The signal can arrive at the receiving antenna at many angles. Thus, forming distinct beampattern nulls to cancel interference and forming conventional high-gain lobes to admit the desired signal would be ineffective.

Secondly, these references adapt the parasitics based on the received power level only, and provide no mechanism for identifying the desired signal from the surrounding interference. Thus, the antenna system in H26 and H375 may steer the antenna beampattern to a high power level that is deplete of signal and contains simply interference. This is because H26 and H375 are only concerned with maximizing the power level of the signal, not its received quality. This is particularly problematic in high interference environments where the interference level can be equal to or greater than the signal level.

H26 and H375 are deficient in several other respects. They provide no teaching at all regarding the use of negative resistance devices as a loading element, either alone or in combination with reactive devices, in order to extend the beamforming capability of the parasitic elements. The references provide no detailed method for coordinating the control of the parasitic elements. They provide no teaching of separate acquisition and tracking modes, which, as described below, can be highly advantageous in an adaptive parasitic array antenna for use in dynamically changing environments. These references only relate to a receiving antenna system, and thus provide no teaching that relates to a transceiver antenna system that may both receive and transmit information. For these, as well as other reasons, H26 and H375 are highly limited in terms of an antenna system for use in a high multi-path, high interference environment. Indeed, neither of the structures shown in these references would work at all in such an interference rich, high multipath environment.

Thus, there remains a general need in this field for an adaptive parasitic array antenna system that is particularly well-suited for use in high multi-path environments.

SUMMARY

An antenna system is provided including an adaptive parasitic array antenna comprising at least one active element and one or more parasitic elements coupled to controlled impedances ("CI"). The system further comprises a transceiver, a content-based optimization criterion computation module ("CBOCCM"), and a control variable optimizer ("CVO"). The CBOCCM receives a signal waveform from the active element through the transceiver, and computes an optimization criterion ("OC") based on the content of the received signal. The optimization criterion is coupled to the CVO, which adaptively computes one or more control variables ("CV"), which are coupled to the controlled impedances in order to adjust the beampattern created by the adaptive parasitic array antenna. Also disclosed are two preferred adaptation implementations and algorithms, a pilot-tone based adaptation system, and a decision-directed based adaptation system.

By adapting the parasitic array antenna pattern based upon the content of the received signal (as distinguished from the power level or some other non-content based criterion), the present invention provides an antenna system that is capable of operating in high interference environments. An antenna system according to the present invention is particularly well-suited for use with cellular and other wireless communication systems that are deployed in urban areas where the environment is replete with multi-path. The system disclosed also provides a controlled impedance network for the parasitic elements that includes a negative resistance device, alone or in combination with a reactive device, in order to greatly extend the beamforming capabilities of the antenna.

One aspect of the invention provides an antenna system, comprising: an array antenna for generating a beam pattern, the array antenna comprising at least one active element and a plurality of parasitic elements, wherein the active element is coupled to a transceiver for transmitting and receiving data signals, and the parasitic elements are coupled to controlled impedance networks; and an adaptation controller coupled to the transceiver and the array antenna for extracting content information from the received data signals and altering the impedance of the controlled impedance networks in order to adapt the beam pattern of the array antenna.

Another aspect of the invention provides a method of operating an array antenna having at least one active element and a plurality of parasitic elements, the method comprising the steps of: (A) providing a plurality of controlled impedance networks coupled to each of the parasitic elements; (B) receiving a data signal at the array antenna; (C) extracting content information from the received data signal; and (D) altering the impedance of the controlled impedance networks based upon the content information so as to adapt the beam pattern of the array antenna.

Another aspect of the invention provides a system, comprising an array antenna having an active element and a plurality of parasitic elements, wherein each of the parasitic elements is coupled to a controlled impedance network; and a controller that receives a data signal from the array antenna and alters the impedance of the controlled impedance networks based upon the content of the data signal.

Still another aspect of the invention provides a pilot-tone based adaptive array antenna system, comprising an array antenna having at least one active element and a plurality of parasitic elements, wherein each of the plurality of parasitic elements is terminated with a controlled impedance network; a transceiver coupled to the active element for received a data signal from the array antenna and for transmitting a data signal to the array antenna; and an adaptation controller coupled between the transceiver and the plurality of parasitic elements, wherein the adaptation controller comprises an optimization criterion computation module for extracting a pilot tone signal from the received data signal and for generating an optimization criterion; and a control variable optimizer for generating a set of control variables based upon the optimization criterion, wherein the control variables are applied to the controlled impedance networks in order to adapt the beam pattern of the array antenna.

Still another aspect of the invention provides a decision-directed based adaptive array antenna system, comprising an array antenna having at least one active element and a plurality of parasitic elements, wherein each of the plurality of parasitic elements is terminated with a controlled impedance network; a transceiver coupled to the active element for received a data signal from the array antenna and for transmitting a data signal to the array antenna; and an adaptation controller coupled between the transceiver and the plurality of parasitic elements, wherein the adaptation controller comprises an optimization criterion computation module for generating an optimization criterion by comparing the received data signal with a reconstructed version of the received data signal; and a control variable optimizer for generating a set of control variables based upon the optimization criterion, wherein the control variables are applied to the controlled impedance networks in order to adapt the beam pattern of the array antenna.

Yet another aspect of the invention provides a method of operating an adaptive array antenna having at least one active element and a plurality of parasitic elements, wherein the plurality of parasitic elements are each coupled to a controlled impedance circuit, the method comprising the steps of: (A) providing a set of control variables; (B) setting the control variables to a mid-point value; (C) applying the control variables to the controlled impedance circuits; (D) operating the adaptive array antenna in an acquisition mode in which the values of the control variables are perturbed by a maximum amount; and (E) following the acquisition mode, operating the adaptive array antenna in a tracking mode in which the values of he control variables are perturbed by a minimum amount.

Another aspect of the invention provides an antenna, comprising: at least one active element; a plurality of parasitic elements; and a controlled impedance network coupled to each of the parasitic elements, wherein the controlled impedance network includes a tunnel diode.

The present invention overcomes the disadvantages of presently known parasitic array antenna systems and also provides many advantages, such as: (1) optimization for use in high multi-path environments; (2) provision for diversity combining and hence resilience to fading; (3) providing for a high degree of interference suppression; (4) providing for significant system channel capacity improvements through increased channel re-use; (5) providing adaptive directivity/antenna gain; (6) removing the need to physically point or re-point the antenna; (7) reducing portable terminal power consumption (over filly adaptive designs); (8) reducing cost of a wireless system deployment; (9) avoiding key cost drivers of fully adaptive antennas while achieving similar performance advantages; (10) the ability to be used in both base station and terminal equipment; (11) having a transmitting path through the beamforming antenna that is identical to the receiving path and hence no transmit-receive calibration is required; (12) reducing the requirement on channel equalization when used to suppress multi-path; and (13) in high interference environments, reducing receiver dynamic range requirements.

These are just a few of the many advantages of the present invention, which is described in more detail below in terms of the preferred embodiments. It should be noted that not all of these advantages are required in a system that practices the present invention and the listing is set forth only to illustrate the many possible advances that are provided. As will be appreciated, the invention is capable of other and different embodiments, and its several details are capable of modifications in various respects. Accordingly, the drawings and description of the preferred embodiments set forth below are to be regarded as illustrative in nature and not restrictive.

DETAILED DESCRIPTION OF THE DRAWINGS

Figure 1:
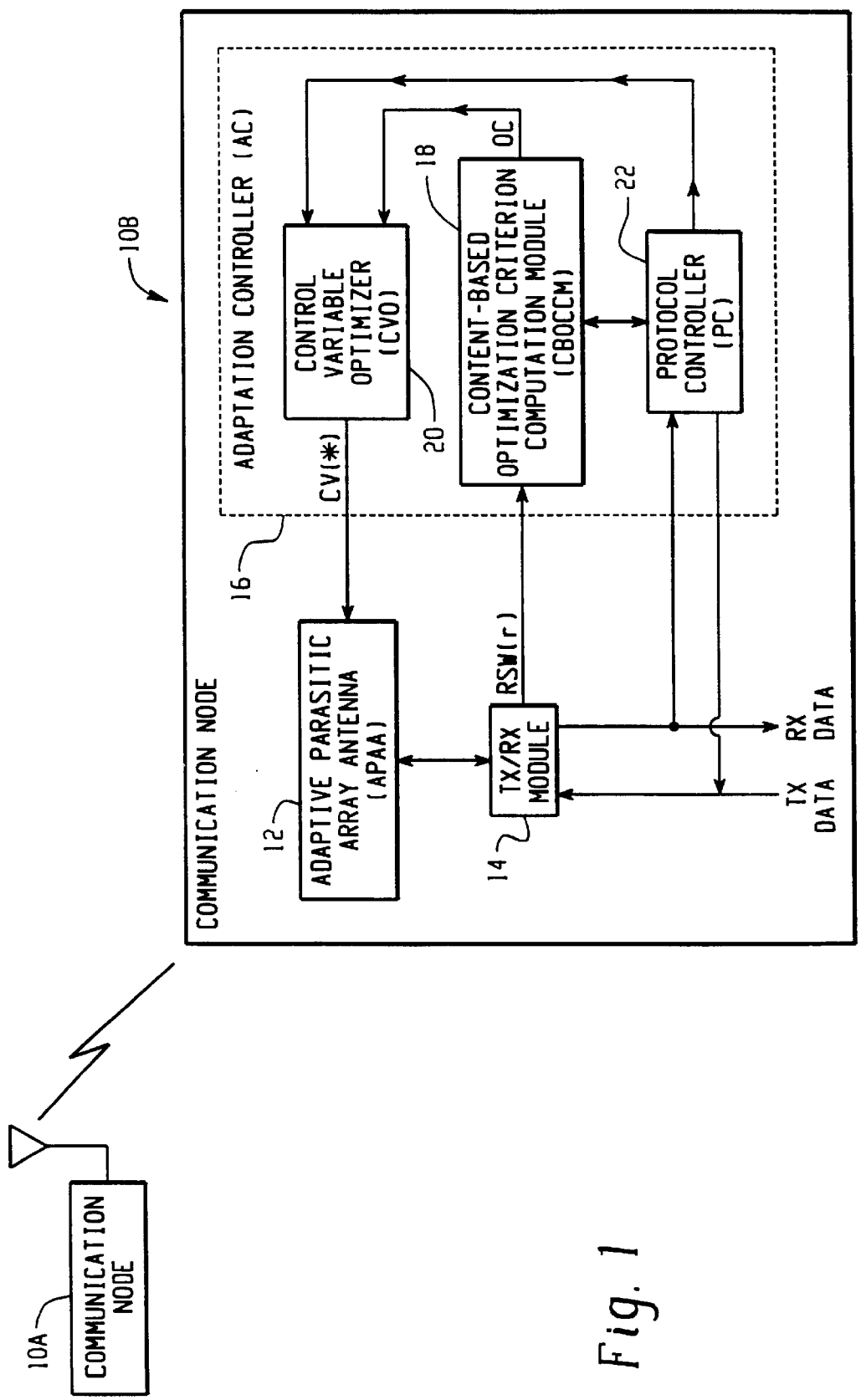
FIG. 1 is a system diagram of a communication node having an adaptive parasitic array antenna system according to an embodiment of the present invention.

Turning now to the drawing figures, FIG. 1 is a system diagram of a communication node 10B having an adaptive parasitic array antenna system according to an embodiment of the present invention. Also shown in FIG. 1 is another communication node 10A that is transmitting and receiving data to and from communication node 10B. Communication node 10A may also include an adaptive parasitic array antenna system according to the present invention.

Preferably, the adaptive parasitic array antenna system includes an adaptive parasitic array antenna ("APAA") 12, a transceiver module 14, and an adaptation controller ("AC") 16. The adaptation controller is coupled between the transceiver module 14 and the APAA 12. Preferably, the APAA 12 includes a plurality of antenna elements. At least one of the antenna elements of the APAA 12 is an "active" element that is coupled to the transceiver module 14 for receiving and transmitting data (TX Data and RX Data), and the other elements are the "parasitic" elements. The TX Data is provided to the transceiver module 14 for transmission through the APAA 12, and the RX Data is received by the transceiver module 14 for use by the communication node 10B. The parasitic elements are not coupled to the transceiver 14, but, instead, are coupled to controlled impedance (CI) networks (see below), which control the coupling between the parasitic elements and the one or more active elements in order to control the antenna beam pattern.

A received signal waveform RSW (r) is received at the transceiver 14 and supplied to the adaptation controller 16. The basic purpose of the adaptation controller 16 is to adaptively control the CI networks of the parasitic elements in response to the RSW (r) signal received at the one or more active elements of the APAA 12. Preferably, the AC performs this adaptation function using three elements, a content-based optimization criterion computation module (CBOCCM) 18, a control variable optimizer (CVO), and a protocol controller (PC) 22. The CBOCCM 18 receives the RSW (r) signal from the transceiver 14 and computes an optimization criterion (OC) based upon the content of the RSW (r) waveform. Examples of the types of OC that can be computed based on the content of the received waveform (r) include signal-to-noise ratio (SNR), signal to interference plus noise ratio (SINR), bit-error rate (BER), and may include any other type of criterion that relates to the signal content of the received waveform.

The output of the CBOCCM 18 is directed to the control variable optimizer 20, which preferably generates a normalized (e.g., a scale of 0 to 1) control variable vector CV(*), which vector includes a control variable for each of the parasitic elements of the APAA 12. Note that the nomenclature X(*) is used throughout this application to refer to an array or vector of values. For example, if the APAA 12 included 6 parasitic elements, then the control variables for each element would be designated CV(1), CV(2), ... CV(6), and the entire vector is referred to as CV(*). The control variables CV(*) are coupled to the controlled impedance (CI) networks of the various parasitic elements of the APAA 12, and adaptively adjust the impedance on these networks as the computed OC value changes. It is by optimizing the OC value through successive iterations of the adaptation controller that the present invention is able to operate in high interference environments.

The protocol controller 22 supervises and manages the overall operation of the adaptation controller 16. It is also coupled to the TX Data, RX Data signals to and from the transceiver module 14 in order to control the operation of the adaptation controller under certain situations, and also in order to send signals back through the APAA 12 to another protocol controller 22 in another communication node 10A. (The detailed operation of these elements is described in more detail below in connection with FIGS. 2–10.)

As seen in FIG. 1 (and the remaining drawings), the present invention involves the integration of antennas/electro-magnetics (EM), RF electronics, software/firmware/hardware, and adaptive digital signal processing. The design of this system also accommodates the nature of the radio frequency propagation environment in which it operates, which is preferably a high multi-path environment. Before describing the specifics of the preferred pilot-tone and decision-directed based adaptive systems, it is instructive to consider several general aspects of antenna design, RF electronics, and beamformer adaptation that relate to the present invention.

1. Antennas/EM

Mutual coupling between antenna elements arises due to their close proximity. The coupling coefficients can be viewed as being analogous to the active element weighting used in a conventional beamformer. These coupling coefficients or weights can be derived for the APAA by first evaluating the open-circuit impedance matrix ($Z^{oc}$) associated with the array that includes all the self and mutual impedances of the antenna elements. Consider the impedance matrix formed by adding the terminating impedances to the diagonal entries of $Z^{oc}$. The column corresponding to the active element of the inverse of this impedance matrix is proportional to the beamforming weight vector.

Compared to a fully digital beamformer, the weights for a parasitic array cover a limited sub-space of values and hence, for a given number of elements, results in some reduction of performance. The effect of this loss can, however, be mitigated by adding additional parasitic elements to compensate for the loss.

Performance is also affected by element spacing in two ways. As spacing is reduced, mutual coupling effects increase, providing more control over beamformer weights. An opposing effect is that as the element spacing is reduced the correlation of the signal between elements also increases, thus reducing the performance of the beamformer. The position and number of elements should be chosen to optimize a given performance criterion.

2. RF Electronics

The terminating impedance of a parasitic element is typically controlled by a DC biased PIN diode or other means acting as a variable RF impedance. With a PIN diode, the RF resistance drops with increasing forward DC bias current. An advantage of using a PIN diode in this application is that it offers very high RF linearity. Therefore, the PIN diode can be used even in transmit operation where lack of linearity would introduce undesirable radiated intermodulation signals.

The present invention uses continuous control (versus open/short) for the parasitic terminating impedances (CI). This offers two advantages. First, as adaptation proceeds, the variation of weights can be smoother (due to smaller steps than open/short control permits) resulting in less chance of weight modulation increasing the bit error rate. Secondly, continuous control allows for gradient based or "hill climbing" methods of optimization to be used in the adaptive processing. Gradients can be estimated by using small perturbations in the impedance controls, which is not possible with switched open/short controls.

A major cost benefit of the present invention is that only a single radio transceiver 14 is connected to the active element. As a receiver, it is used to provide the conventional function of providing signal output, and also further provides the means by which an optimization criterion (OC) can be derived. The optimization criterion is used by the Adaptation Controller 16 to compute adjustments to the terminating impedances (CI) through the control variable vector CV(*). In transmit mode, the transceiver 14 acts as it would in a conventional wireless system.

Conventional digital beamforming antennas (including smart antennas) require weighting and summing operations in the digital domain using digital multipliers and adders, requiring first a full radio transceiver (or at least a receiver) function for each antenna element through to the digital domain. One of the advantages of digital beamforming is that high accuracy and stability are achievable. Unfortunately, this advantage comes at a great price in that both these RF transceiver functions and digital functions are hardware intensive, and moreover, the digital functions require high processing rates since they must be performed at the full signal bandwidth.

It could be argued that implementing the beamformer at the front end, as in the present invention, is a step backward to earlier analog beamforming techniques. Such antennas employed variable or fixed control of the amplitude and phase of the signal received by each antenna element. The final antenna beam was then formed by electrically summing these weighted signals. In the present invention, the parasitic array achieves the beamforming in much the same was as the analog beamformer described above. The present invention, however, implicitly influences the antenna weighting function through control of an electrical component's characteristics (one component is connected to each parasitic antenna element), and, in effect, the weighting and summing functions are performed through the electromagnetic coupling between the active and parasitic elements. In this way, considerable RF/microwave components and transmission lines required for an analog beamformer can be avoided, thus significantly lowering its cost and complexity, and profoundly lowering the cost in comparison to the all-digital approach described above.

It is important to note that in the preferred embodiment of the present invention, the adaptive processing (estimation of how to affect the antenna control elements (CI)) is still performed digitally, as it is for the conventional adaptive digital beamformer. The control algorithm, however, controls the terminating impedances (CI) at each parasitic element rather than the amplitude and phase weightings for each element as in a conventional beamformer.

Conventional smart antennas operate adaptively only on the receive signal, and count on either identical transmission characteristics (which is impractical), or a calibration of the differences between transmission paths and reception paths. Such calibration may be required at initial deployment and over time, thus increasing cost and complexity of the solution considerably. The present invention does not require such calibration as the transmit path through the beamformer (APAA) 12 is identical to that on receive since the same circuit elements are used, unlike the receive and transmit paths of a conventional digital beamformer.

A further advantage of the present invention is that it effectively performs adaptive beamforming ahead of the radio transceiver 14 and thus in high co-channel interference (i.e., strong signals needing to be suppressed by the beamformer), dynamic range requirements for the receiver may be reduced, further reducing cost and complexity.

3. Beamformer Adaptation

The function of adaptive processing is to adjust the impedance controls (CI) and hence beamforming weights such that a given performance criterion (e.g., SINR, mean squared error, etc.) is optimized. This process must continuously update the control vector CV(*) so as to track changes in the communications channel. This function is generally performed on receive only (unless feedback from the remote receive end of the wireless link such as from 10A is used for adaptive processing as well).

Conventional adaptive beamforming algorithms (e.g., least-mean-square (LMS), recursive least-squares (RLS), direct matrix inversion (DMI)) are not directly applicable in this type of single-active element antenna, as these algorithms require the vector of individual element outputs, which are only available on a conventional adaptive digital beamformer having a plurality of active elements. The present invention has overcome this problem through the use of two preferred adaptation schemes, a pilot-tone based scheme (described in more detail with reference to FIG. 2), and a decision-directed based scheme (described in more detail with reference to FIG. 3). Both of these schemes provide adaptive control of the beam pattern based on the content of the received signal.

Figure 2:
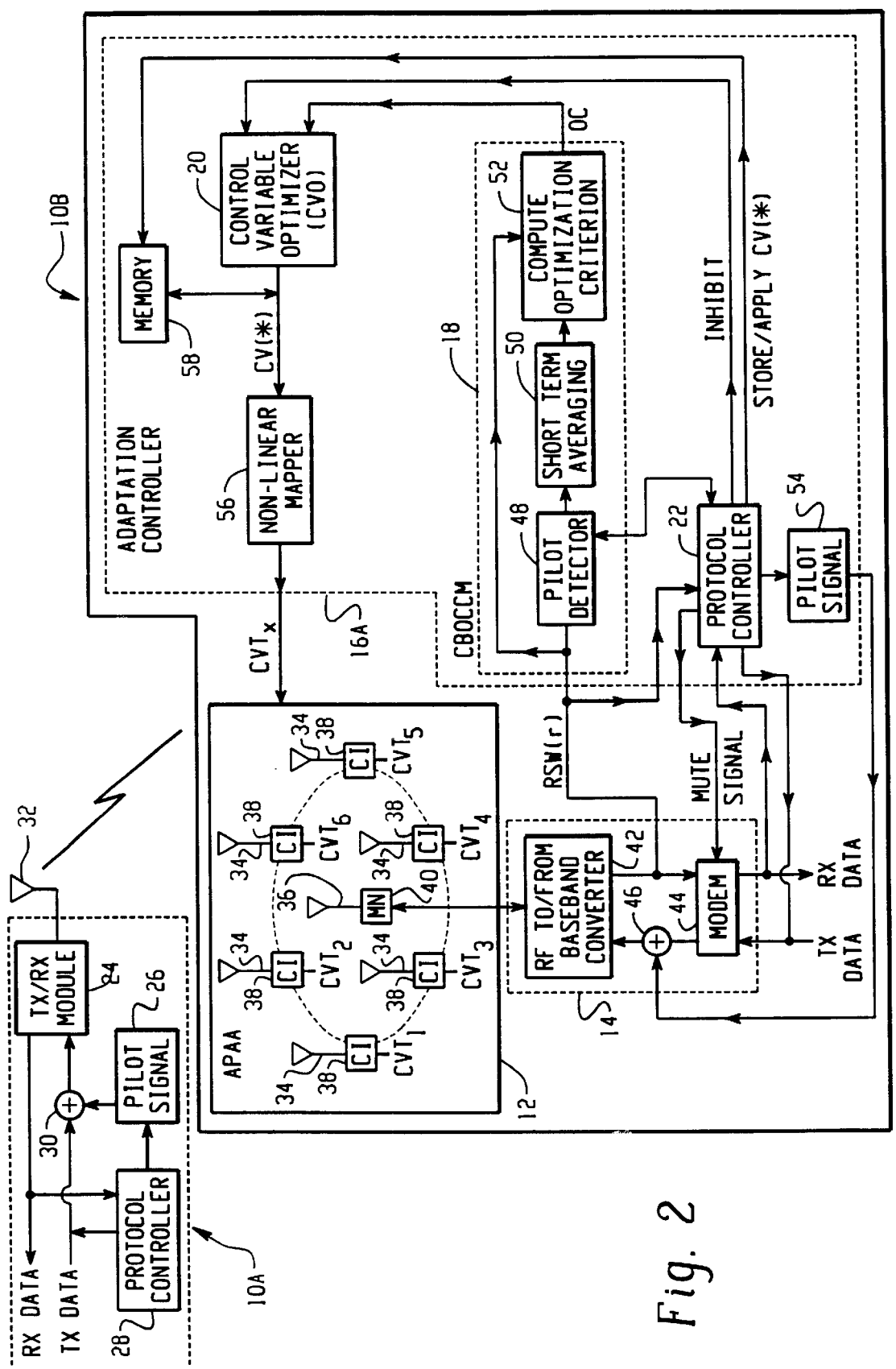
FIG. 2 is a more detailed system diagram of the communication node shown in FIG. 1 in which the adaptive parasitic array antenna system includes a preferred pilot-tone based adaptation controller.

FIG. 2 is a more detailed system diagram of the communication node 10B shown in FIG. 1 in which the adaptive parasitic array antenna system includes a preferred pilot-tone based adaptation controller 16A. Also shown in this figure is an expanded diagram of another communication node 10A, which may or may not include the adaptive parasitic array antenna system of the present invention, but which does include some type of antenna 32 (which could be an adaptive parasitic array antenna APAA 12 such as shown in 10B), a transceiver module 24, a pilot signal generator 26, a mixer 30, and a protocol controller 28 for at least controlling the pilot signal generator 26. Although not shown explicitly in FIG. 2, the communication node 10A may also include the APAA 12 and the Adaptation Controller 16A similar to those shown in communication node 10B.

The communication node 10A may be a conventional wireless transceiver except that it must be capable of transmitting the pilot signal 26 and support the system protocol. Preferably, the communication node 10A will transmit the pilot signal at full carrier power on start-up (listening for a response from the basestation 10B) and transmit user data when the basestation signals it to do so with the pilot power below (e.g., 10 dB) the data carrier power. When loss of connection occurs, it should revert back to start-up. Note that the protocol controller 28 in the communication node 10A may communicate protocol and other command and status information with the protocol controller 22 in the communication node 10B.

Data transmissions from communication node 10B are received by the antenna 32 of the communication node 10A and passed onto the rest of this node as RX Data signals. The transmission data from this node 10A, TX Data is mixed together with a pilot tone signal 26 by mixer 30 and transmitted via the transceiver module 24. This mixed TX Data/pilot tone signal is received by the communication node 10B, where it is received and used to adapt the included adaptive parasitic array antenna 12 so as to maximize the desired optimization criterion (OC).

The preferred pilot-tone based system 10B includes an adaptive parasitic array antenna 12, a transceiver module 14, and a pilot-tone based adaptation controller 16A coupled between the transceiver module 14 and the CI inputs of the APAA 12. The APAA 12 includes at least one active antenna element 36 and one or more (preferably 6 to 32) parasitic antenna elements 34 which are electromagnetically-coupled to the active element 36. The APAA 12 shown in FIG. 2 includes 6 parasitic elements. Preferably, all of the antenna elements 36, 34 are mounted on a single structure, such as a planar square or disk, with the single active element 36 mounted in the central portion of the structure, and the parasitic elements 38 mounted in some geometrical pattern about the center active element 36. Note that this is just one type of structure for organizing the antennas elements 36, 34. They could be organized in many other types of structures and configurations depending on the application for the antenna system.

Each of the parasitic elements 34 is terminated with a controlled impedance (CI) network 38. Two example CI networks 38 are described in more detail below in connection with FIGS. 9 and 10. Preferably through, the CI networks 38 include a variable impedance component, such as a PIN diode, and may include other components, such as inductors, capacitors and resistors. Each CI network 38 includes an input for receiving a control variable voltage signal ($CVT_x$), where x is a numerical designation for the parasitic antenna number, such as $CVT_1$ for parasitic antenna number 1 and $CVT_4$ for parasitic antenna number 4. The control variable voltage $CVT_x$ is applied (either directly or indirectly through the other components) to the variable impedance component, such that the loading on the parasitic array antenna 38 can be varied by varying the level of the applied control variable voltage $CVT_x$. In this manner, the electromagnetic coupling between the parasitic antennas 34 and the active antenna element 36 can be controlled in order to tune the beampattern of the APAA 12.

Optionally, a tunnel diode can be utilized in the CI networks 38 which, under certain biasing conditions, can provide an adjustable negative resistance for the parasitic terminating impedance CI. This allows the effective weights to extend over a much wider range including exceeding unity. Essentially this provides additional gain for the array. It also allows placing the tunnel diode controlled parasitic elements 34 farther from the active element 36 providing for additional spatial de-correlation. Wider separation would also allow for using many more elements.

One draw back of the tunnel diode is that it generally cannot handle the high level of RF power that a PIN diode can. Therefore it may be necessary to use a combination of PIN and tunnel diodes on receive and then bias the tunnel diodes off upon transmit. In such an arrangement the tunnel diodes could be arranged on the outer edge of the array geometry.

Also optionally, the active element 36 may be coupled to a fixed or adjustable matching network 40 in order to increase the performance of the APAA 12. Many different types of matching networks 40 could be used in conjunction with the active element 36.

The transceiver module 14 for the pilot-tone based system 10B preferably includes an RF to/from baseband converter 42, a modem 44, and a mixer 46. The RF to/from baseband converter 42 receives an analog RF signal from the active antenna element 36 when the system 10B is in receive mode, and transmits an analog RF signal to the active antenna element 36 when the system 10B is in transmit mode. The purpose of the converter 42 is to convert the received RF signal to a received baseband signal and to convert the transmit baseband signal into an RF signal. The received baseband signal is termed the receive signal waveform, and is designated by RSW or (r). The received signal waveform is coupled to the modem circuit 44, which demodulates the analog signal and recovers the RX Data. The TX Data from the communication node 10B is modulated by the modem circuit 44, mixed with a pilot signal from a pilot signal generator 54 in the mixer 46, and then passed to the RF to/from baseband converter 14, which converts the TX signal to an appropriate RF signal frequency and applies that upconverted signal to the active antenna element 36 for propagation.

The pilot-tone based adaptation controller 16A preferably includes a content-based optimization criterion computation module (CBOCCM) 18, a control value optimizer (CVO) 20, and a protocol controller 22. The controller 16A may also include a pilot signal generator 54, a non-linear mapping circuit 56, and a local control value memory 58. The CBOCCM 18 for the pilot-tone system preferably includes a pilot tone detector circuit 48, a short-term averaging circuit 50, and an optimization criterion (OC) computation circuit 52. The operation of each of these circuits is described in more detail below. It should be noted that the entire adaptation controller 16A, and/or any of its functional components, such as the CBOCCM 18, the CVO 20, the PC 22, etc., may be implemented either in hardware or software, or a combination of hardware and software. For example, a DSP, FPGA, PLD, ASIC or a combination of discrete components and integrated circuits could be utilized to enable the functionality depicted in the drawing figures. In addition, a software program could be included that may be stored in an embedded memory, such as an EPROM, EEPROM, UVPROM, battery-backed RAM, etc., which, when executed by a DSP, CPU or other form of electronic controller, would implement some or all of the functions depicted in the drawings.

As shown in FIG. 2, a communication node 10A, which could be a user terminal is used to transmit user data (TX Data) for reception by a basestation communication node 10B equipped with an adaptive parasitic array antenna system according to the present invention Note that the invention allows communication in both directions with an adaptive parasitic array antenna optionally used at the user terminal 10A as well. Also, it is possible to have the APAA reside only at the user terminal and not at the basestation.

Mutual coupling between the parasitic elements 34 and a single active element 36 provides beamforming. Monopoles, dipoles, or printed patches can be used for the elements 34, 36. The mutual coupling coefficients can be varied through the use of controllable termination impedances (CI) 38 (e.g., PIN diodes). By adaptively controlling the impedances CI 38 terminating the parasitic elements 34, the array beam-pattern as seen at the active element port is adjusted through an optimization process (as described in FIGS. 4–6) to improve system performance.

A transmitted pilot signal 26 is employed such that it can be reliably extracted on receive in the presence of noise and interference even before the array 12 has adapted. The pilot signal 26 can be any signal (e.g., known pseudo-noise (PN) sequence) which, with processing, can be distinguished from other signals. The pilot signal 26 can be continuously added to the user terminal transmission (TX Data) with pilot signal power sufficiently below that of transmit data signal power. In this way, the pilot does not interfere with reception of user data by the basestation modem 44 in the transceiver module 14, or use significant carrier power which may otherwise reduce the carrier power available for the user data signal.

Alternatively, the system may transmit only the pilot signal in a short burst and then subsequently transmit the User TX Data signals. In this alternative method, the pilot burst may be transmitted about 2–10% of the time with the user data signal being transmitted 90–98% of the time. Furthermore, the adaptation controller would preferably operate only during the pilot signal burst, and would not necessarily further adapt during the time when the TX data is being received, although it may still do so depending upon the application.

The active element 36 of the adaptive parasitic array antenna 12 is connected to the RF up/down-converter 42. The output of the RF up/down-converter 42 is routed to a conventional data modem 44 for the user data function. The RF down-converter also feeds the adaptation loop with the received signal waveform (r). This waveform (r) is fed to the CBOCCM 18 module, which provides the optimization criterion OC that is used to generate the control variables CV(*) that control the loading of the parasitics 34, and thus the beampattern of the antenna 12.

Preferably, the first step of the adaptation loop, pilot extraction 48, is used to discriminate between desired and other signals. This can generally be implemented as a correlator. The criterion to be optimized OC can be SINR, BER, received signal delay spread, system capacity, etc. In the case of SINR, the extracted pilot signal is used to estimate the desired user signal power ($P_d$). The interference plus noise power ($P_I$) can be estimated as the difference between the total signal power and the desired user signal power. The optimization criterion is then computed 52 as the ratio $P_d/P_I$). In the cases where insufficient correlation time and/or averaging is employed for reliable optimization, statistical fluctuations in the optimization criterion can be reduced through short-term averaging 50.

The optimization process 20 adjusts the control variables CV(*) to adapt the parasitic array beampattern. It is important to note that large steps of the control variables CV(*) will perturb the output of the array (weight modulation) and can prevent the modem 44 from operating reliably. The optimization is performed in two stages—acquisition followed by tracking. The acquisition stage is used to rapidly adapt the array to achieve performance sufficient for the modem to operate. When the acquisition stage is complete, a tracking stage is used to compensate for changes in the propagation channel.

During acquisition, large steps in the controls CV(*) can be used as the modem function is suspended during this stage. This is done by muting the modem using a signal from the protocol controller 22. The set of control variables are denoted by the vector CV(*). Without loss of generality, the control variables CV(*) are normalized to lie between 0 and 1. Initially, the control variables CV(*) are set to midrange, i.e., 0.5. The system then iterates through the acquisition method as described in more detail below in connection with FIG. 5. Further iterations of the acquisition stage proceed as described below, but only for the control variables CV(*) not changed in previous iterations—i.e., only those control variables remaining at the initial value of 0.5 are tested and potentially changed. These subsequent iterations continue until either an acceptable optimization criterion OC value has been reached or control variables CV(*) no longer change. In the latter case, the control variables CV(*) are set back to the initial mid-point values and the entire acquisition stage re-started. Otherwise, the process proceeds to the tracking stage.

The tracking stage of optimization starts with the control variables CV(*) set as determined by the preceding acquisition stage. In general the control variables are individually perturbed by a prescribed step size. The system will continue in the tracking stage (as described in more detail below in connection with FIGS. 6A, 6B) until a particular optimization criterion history variable has increased beyond a threshold parameter, meaning that the system has been operating without consistently achieving an acceptable OC value, in which case the system either returns to the acquisition stage or loads a previous set of control variables CV(*) from local memory 58. The data modem can be unmuted as soon as, or shortly after, the tracking mode is engaged.

In some cases, the normalized outputs from the CVO 20 (which are preferably in the range of 0 to 1) are in the proper range for controlling the CI networks 38, in which cases these signals CV(*) are the same as the control variable voltages $CVT_x$, and can be fed directly from the CVO 20 to the CI networks 38 through a suitable digital-to-analog (D/A) converter. However, in other cases, the voltage range of 0 to 1 volts will not be proper for controlling the CI networks 38, either because the range of voltages is incorrect, or because there is a nonlinear relationship between the control voltage and the loading generated by the CI network 38. In these cases, it is preferable to interpose a non-linear mapper circuit 56 between the CVO 20 and the CI networks 38 that performs a non-linear mapping function and which also preferably includes appropriate D/A converters. In the case of terminating impedances CI using both PIN and tunnel diodes, this block 56 would control both diodes such that as the control variable spans its range, the terminating impedance changes monotonically without abrupt steps due to both diodes changing jointly.

The final element shown in FIG. 2 is the protocol controller 22. This block 22 is used to co-ordinate the actions required at both ends of the link by transmission of signaling information. This includes determining when the pilot should be transmitted at full versus reduced power, determining the time division duplexing (TDD) synchronization (if employed) and muting the modem before the system has adapted. As such, the protocol controller 22 is coupled to the TX/RX Data, the pilot signal generator 54, the received signal waveform, the pilot detector 48, and is configured to generate a mute signal to the modem 44, an inhibit signal to the CVO circuit 20, and a store/apply CV(*) signal to the optional memory 58. The mute signal has been discussed previously. The inhibit signal is applied to the CVO during data transmission. The store/apply CV(*) signal is an optional feature of the invention, and issued to store certain control variable vectors that are considered "good" sets of control variables for the particular environment in which the system is operating, and then to apply one or more of those stored control vectors when the optimization algorithm indicates that the system is no longer effectively optimizing the optimization criterion (OC).

Figure 3:
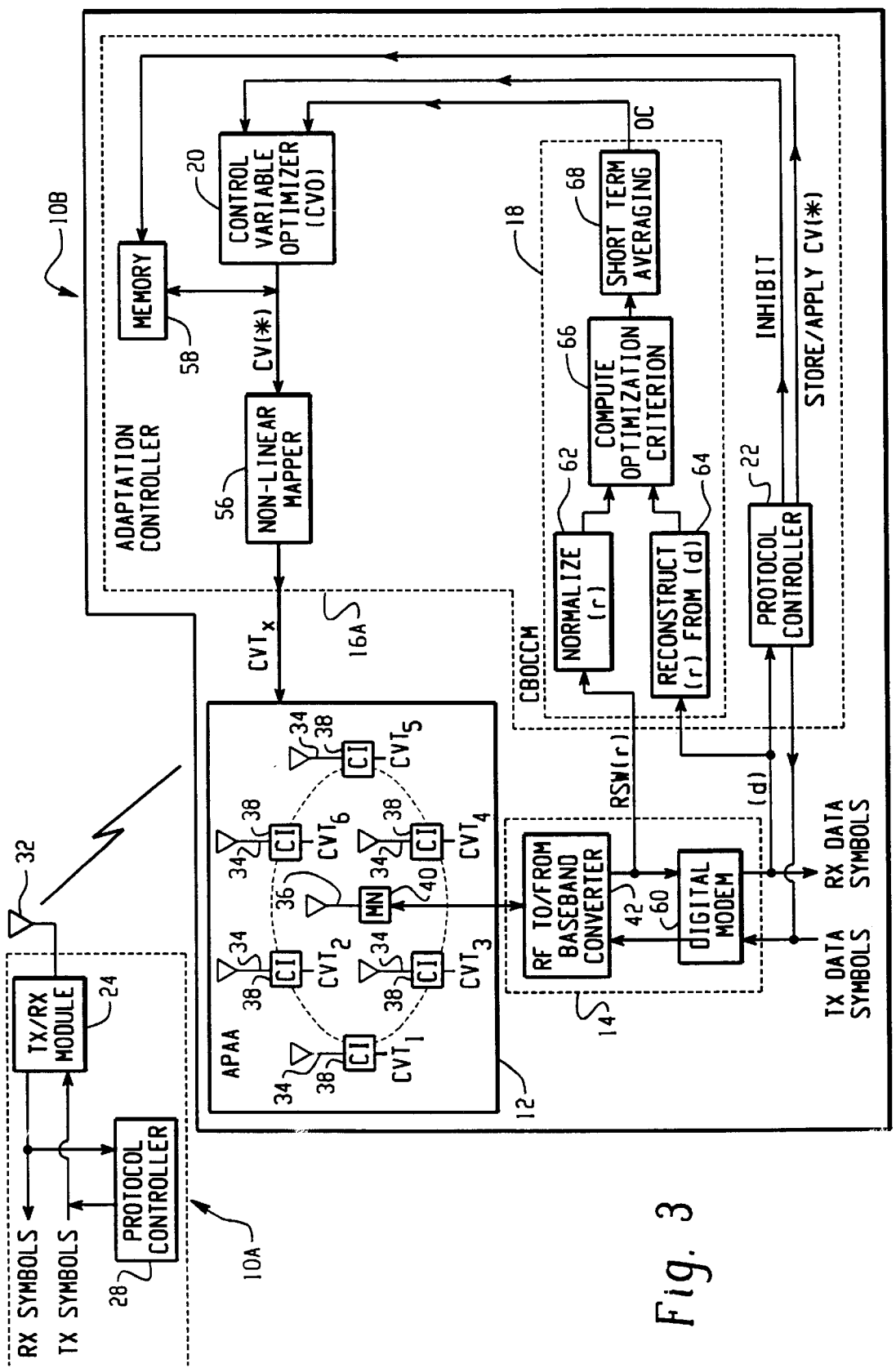
FIG. 3 is a more detailed system diagram of the communication node shown in FIG. 1 in which the adaptive parasitic array antenna system includes a preferred decision-directed based adaptation controller.

FIG. 3 is a more detailed system diagram of the communication node 10B shown in FIG. 1 in which the adaptive parasitic array antenna system includes a preferred decision-directed based adaptation controller 16B. The antenna system including the decision-directed based adaptation controller 16B is similar in many respects to the pilot-tone based system described in FIG. 2. Hence, the common features of these two systems will not be described in detail again with reference to FIG. 3.

In the decision-directed based adaptation controller 16B there is no pilot signal. As such, blocks 26, 30, 46 and 54 in FIG. 2 are missing from FIG. 3. Instead of using the pilot tone in the adaptation algorithm, the decision-directed system compares the received signal waveform (r) to a reconstructed version of the demodulated waveform (d) in order to compute the optimization criterion (OC). This is done through several blocks in the CBOCCM 18, including a normalization block 62, a reconstruction block 64, a compute optimization criterion block 66, and a short term averaging block 68. The reconstruction can be achieved in effect by re-modulation.

The optimization criterion (OC) in the system shown in FIG. 3 is based on the residual error (OC) that results from the difference between the normalized received signal waveform (output of block 62) and the re-modulated received data symbols (output of block 64). Note that in general, the re-modulated received data symbols (d) re-create an estimate of what the received signal waveform (r) would have been if only the desired signal was present, i.e., without noise or interference. Signal level normalization (62) constrains the adaptation such that minimizing the residual error does not inadvertently minimize the total received signal waveform amplitude level. Statistical fluctuations in the optimization criterion are reduced through short-term averaging (68).

The acquisition and tracking algorithms for the system shown in FIG. 3 preferably operate in the same manner as those for the system shown in FIG. 2. These algorithms are now described in more detail with reference to FIGS. 4–8.

Figure 4:
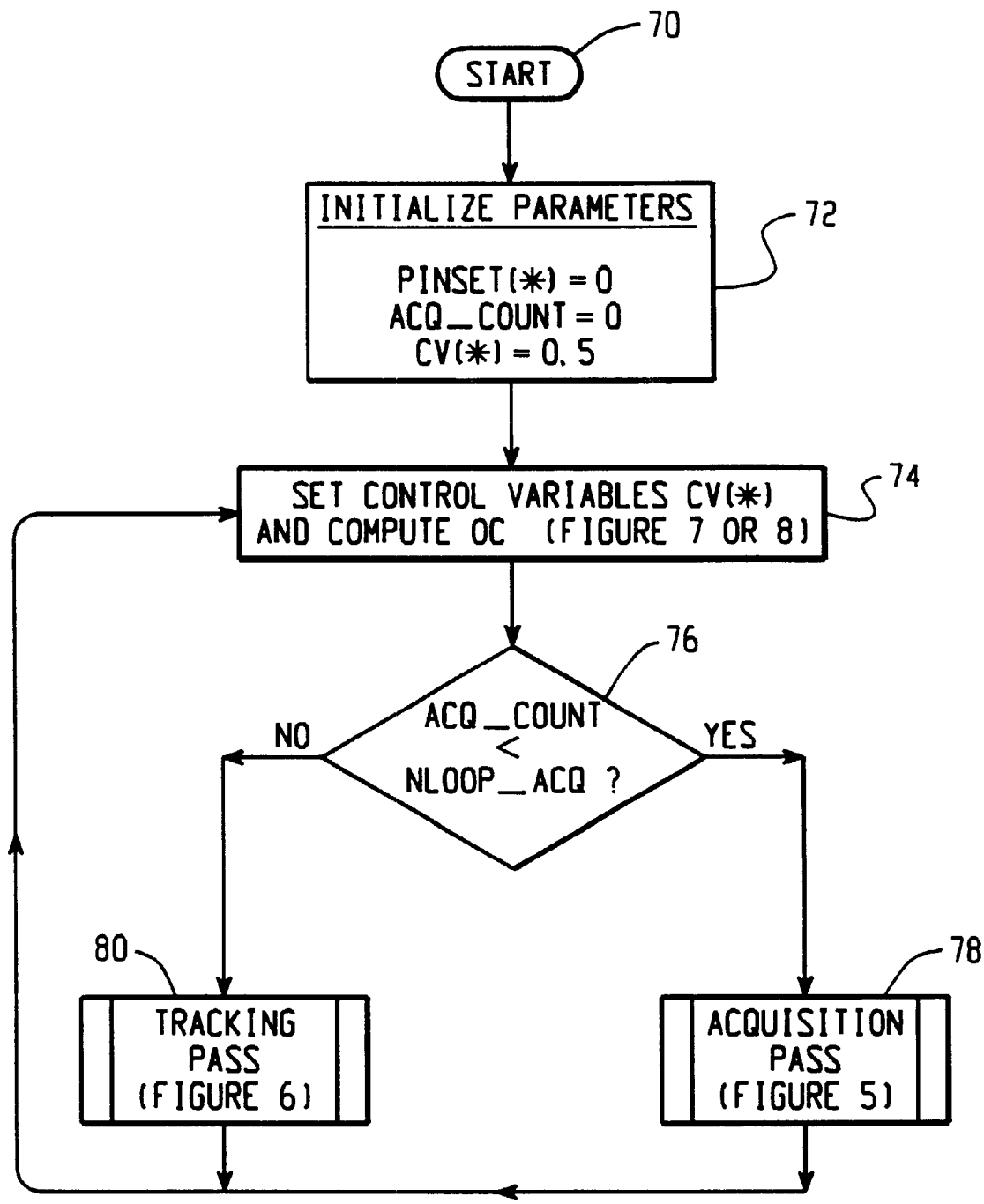
FIG. 4 is a basic flowchart of the preferred method of operating the adaptation controller shown in FIGS. 2 and 3, including an acquisition pass and a tracking pass.

FIG. 4 is a basic flowchart of the preferred method of operating the adaptation controller 16A, 16B shown in FIGS. 2 and 3, including an acquisition pass and a tracking pass. The method begins at 70. At step 72, the algorithm initializes several parameters, including PINSET(*), $ACQ_{13}$ COUNT, and CV(*). PINSET(*) is a vector (or array) of N elements, where N is the number of controlled impedance (CI) networks in the parasitic array, and hence the number of parasitic antennas 34 in the APAA 12. Initially, all of the elements in PINSET(*) are set to 0. If, during the acquisition pass (FIG. 5), a particular CI network 38 is set to either its high or low limit (described below), then the PINSET(*) element for that particular CI network 38 is set to 1. ACQ_COUNT is a parameter that maintains a count of the times that the algorithm has progressed through the acquisition pass. This parameter is initially set to 0 since at initialization the system has not progressed through any acquisition passes. The CV(*) parameter has been discussed previously. This vector CV(*) is output from the control value optimizer (CVO) 20, and represents an array of N normalized values from 0 to 1, where there are N elements in the vector, one for each of the CI networks 38. Initially, each element in the CV(*) vector is set to its midpoint value, or 0.5.

Having initialized the system at step 72, control of the algorithm passes to step 74, where the control variables CV(*) are set (or output) by the CVO 20 (and thus applied to the CI networks 38), and the optimization criterion (OC) is computed according to the methodology described above with reference to FIGS. 2 and 3, and as described below in FIGS. 7 and 8. Note that in this initial iteration, the CV(*) vector elements are all set to 0.5. Thus, the initial OC computation is carried out on a control variable vector in which all the controlled impedance (CI) networks are set at midpoint.

Control of the algorithm then passes to step 76, where the system determines whether the ACQ_COUNT variable has exceeded a predetermined limit, which is termed NLOOP_ACQ. NLOOP_ACQ is a constant that may be altered depending on the application and environment in which the antenna system is operating, but is preferably in the range of 3–10, although other values, either higher or lower than this preferred range are possible. Since ACQ_COUNT is initially set to 0, the outcome of determination 76 is positive, and control passes to the acquisition pass, which is described in more detail below with reference to FIG. 5. As noted below, each time the algorithm enters the acquisition pass, the ACQ_COUNT parameter is incremented by 1.

After completing the acquisition pass 78, the system cycles back to step 74, where the control variable vector CV(*) is once again set, and the optimization criterion (OC) is computed. As long as ACQ_COUNT is less than NLOOP_ACQ, the determination 76 will be positive, and the system will continue to loop through steps 78, 74 and 76. When ACQ_COUNT is no longer less than NLOOP_ACQ , however, the determination 76 will yield a negative result, and the system will progress into the tracking pass 80, which is described in more detail below with reference to FIG. 6. The system will remain in the tracking pass loop 80, 74, 76, until it is determined that the algorithm has been operating without consistently achieving an acceptable OC value, at which time the ACQ_COUNT variable is reset to 0 and the system reverts to the acquisition pass loop 78, 74, 76.

During the acquisition pass 78, the control variables CV(*) are varied by a relatively large amount, and preferably are varied to their limits—either 0 or 1 (i.e., step sizes of +/−0.5). By distinction, during the tracking pass, the control variables CV(*) are varied by a relatively small amount, such as between 0.05 and 0.1, although other variations are certainly possible. By varying the CV(*) elements by a large amount during the acquisition pass, it has been determined that the antenna array 12 more quickly achieves a near-optimum arrangement. During the tracking pass, however, it has been determined that the better approach is to vary the CV(*) elements by a relatively small amount in order to fine-tune the optimization criterion (OC) and hence the values of the CV(*) vector applied to the controlled impedance (CI) networks 38.

Figure 5:
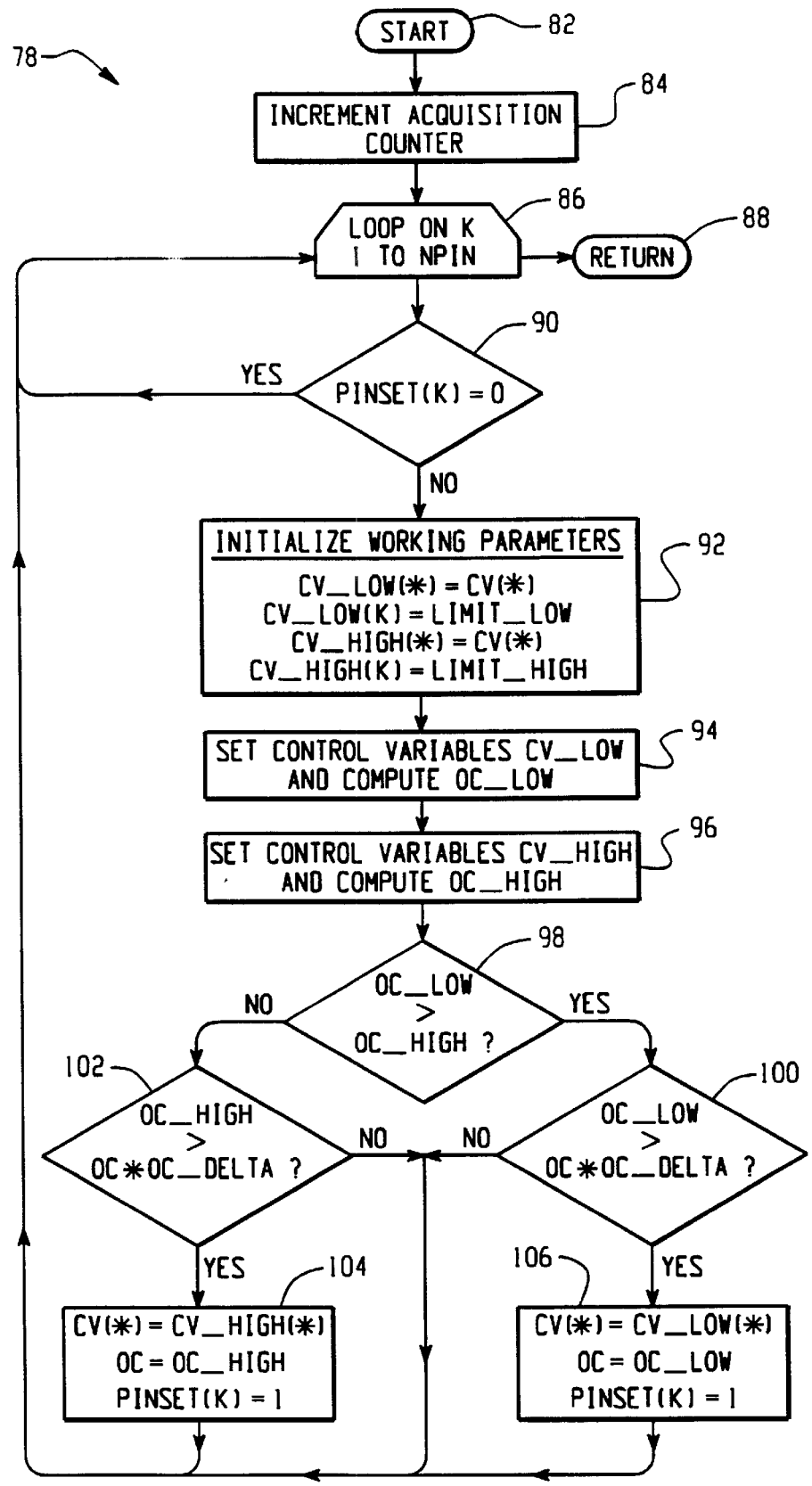
FIG. 5 is a flowchart of the preferred method of operating the acquisition pass in the adaptation controller shown in FIGS. 2 and 3.
Figure 6A:
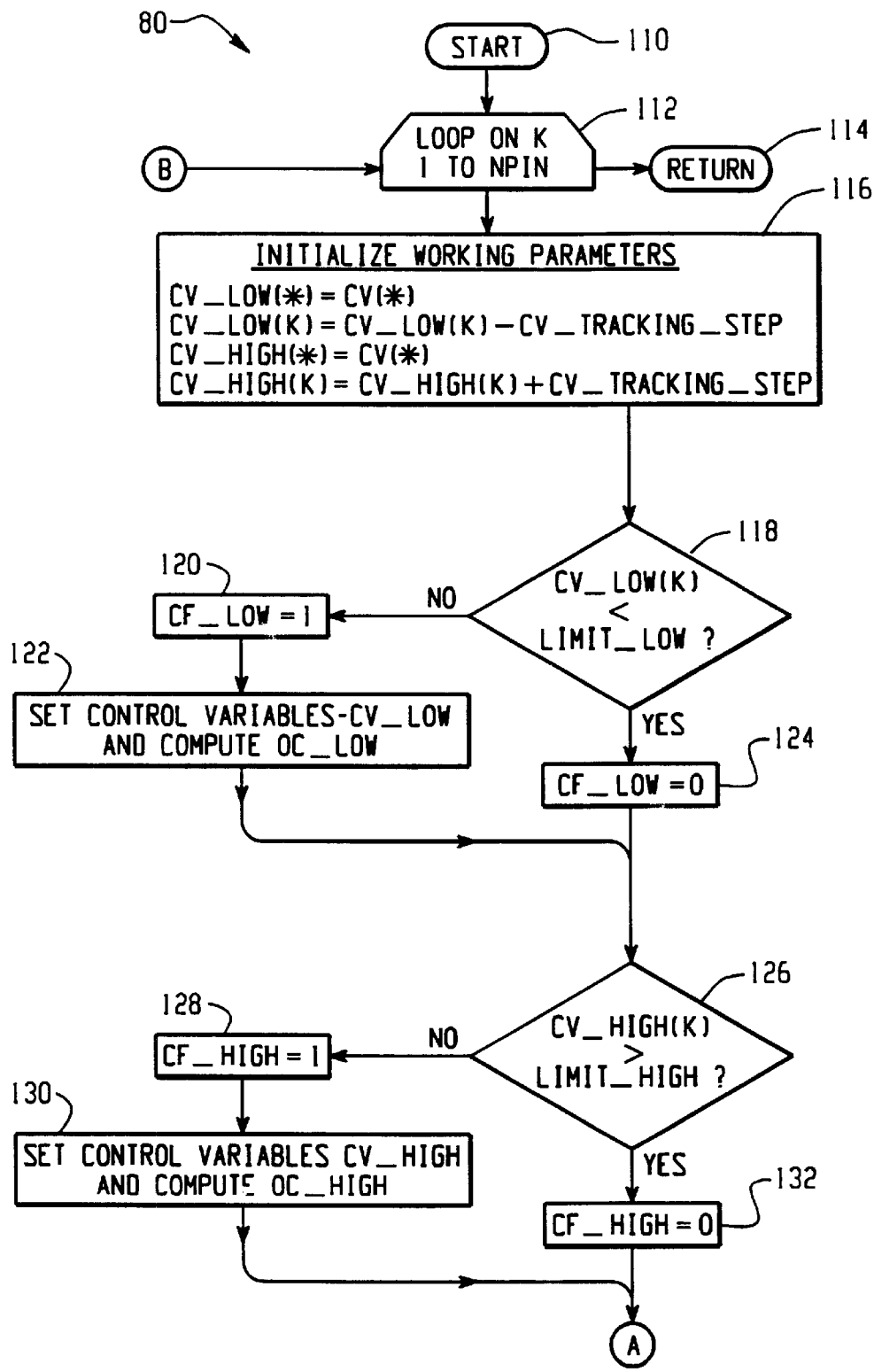
FIG. 6 is a flowchart of the preferred method of operating the tracking pass in the adaptation controller shown in FIGS. 2 and 3.
Figure 6B:
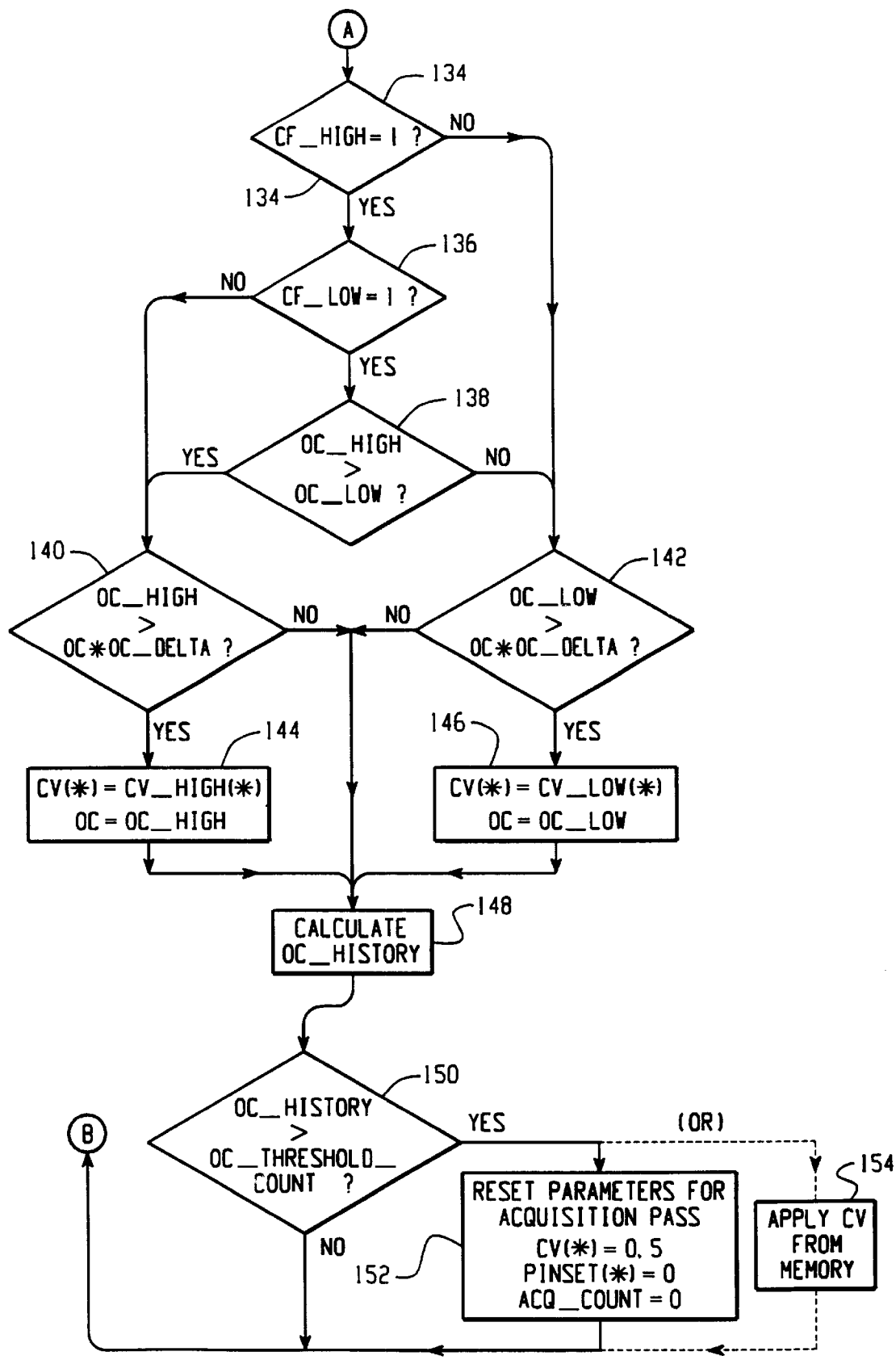

FIG. 5 is a flowchart of the preferred method of operating the acquisition pass 78 in the adaptation controller 16A, 16B shown in FIGS. 2 and 3. The method begins at 82. At step 84, the acquisition counter (ACQ_COUNT) is incremented by 1. The method then enters a loop (steps 86–106), which repeats NPIN times, once for each CI network 38. The looping variable is designated "k". When the method has looped through NPIN times (once for each CI network 38), the method returns 88 to step 74 in FIG. 4.

For each CI network 38, the loop (steps 86–106) operates as follows. First, the method determines whether the PINSET element for the k-th CI network 38 (PINSET(k)) is set to 1. If so, then this indicates that this network 38 has already been set to either end of its control voltage range (as described below), and it should not be further perturbed in the acquisition process. If, however, PINSET(k) does not equal 1, meaning that it is still set to 0, then the method proceeds to step 92 for this particular CI network 38.

At step 92, several working parameters are initialized, including CV_LOW(*), CV_LOW(k), CV_HIGH(*), and CV_HIGH(k). CV_LOW(*) is a vector with as many elements as the vector CV(*), and is initialized to the same elements as CV(*). Likewise, CV_HIGH(*) is a vector with as many elements as the vector CV(*), and is initialized to the same elements as CV(*). These vectors (CV_LOW(*), CV_HIGH(*)) operate like a mask so that only the vector variable of interest (i.e., the k-th variable, which is represented by CV_LOW(k) and CV_HIGH(k)) is perturbed and potentially output to the CI networks 38 as the new control variable vector. CV_LOW(k) is the k-th element of CV_LOW(*), and is initialized to LIMIT_LOW, which is the lowest output level of the CVO 20 block, preferably 0. CV_HIGH(k) is the k-th element of CV_HIGH(*), and is initialized to LIMIT_HIGH, which is the highest output level of the CVO 20 block, preferably 1. Although LIMIT_LOW is preferably 0 and LIMIT_HIGH is preferably 1, these values are arbitrary, and could be other values.

Having initialized the working parameters, at step 94 the control variable outputs CV(*) are set equal to the values of the vector CV_LOW(*) and are output to the APAA 12. The adaptation controller 16A, 16B then computes an optimization criterion (OC_LOW) based on the CV_LOW(*) vector control variables. Then, at step 96, the control variable outputs CV(*) are set equal to the values of the vector CV_HIGH(*) and output to the APAA 12. The adaptation controller 16A, 16B then computes an optimization criterion (OC_HIGH) based on the CV_HIGH(*) vector control variables.

At step 98, the method compares the values of OC_LOW and OC_HIGH. If OC_LOW is greater than OC_HIGH, then control passes to step 100. If, however, OC_LOW is not greater than OC_HIGH, then control passes to step 102. It should be noted here that in the preferred embodiment of the methodology a higher OC value is deemed to be a better set of control variables. The system just as easily could have been designed such that a lower OC value is indicative of a better set of control variables.

If OC_LOW is the better OC, then control passes to step 100, where the system compares the value of OC_LOW to the prior value of OC multiplied by some delta value, termed OC_DELTA. If OC_LOW is greater than the prior OC by at least the OC_DELTA amount, then the control vector (CV_LOW(*)) that generated OC_LOW is deemed to be a better set of control variables than CV(*), and control passes to step 106. If, however, the OC_LOW value is only slightly better than OC (i.e., not better than OC*OC_DELTA), then control passes back to step 86, and the value of "k" is incremented in order to test and potentially change the control variables for the next controlled impedance (CI) 38. At step 106, the control vector CV(*) is set equal to CV_LOW(*), OC is set equal to OC_LOW, and the PINSET(k) element for this particular controlled impedance (CI) 38 is set to 1 so that it will not be further perturbed during the acquisition pass. Control then passes back to step 86 for the next iteration through the k controlled impedance (CI) networks 38.

Likewise, if OC_HIGH is the better OC (i.e., OC_HIGH>OC_LOW), then control passes to step 102, where the system compares the value of OC_HIGH to the prior value of OC multiplied by some delta value, also termed OC_DELTA. (Note that although OC_DELTA is used in both steps 100 and 102, the actual OC_DELTA value for these two steps may be different.) If OC_HIGH is greater than the prior OC by at least the OC_DELTA amount, then the control vector (CV_HIGH(*)) that generated OC_HIGH is deemed to be a better set of control variables than CV(*), and control passes to step 104. If, however, the OC_HIGH value is only slightly better than OC, then control passes back to step 86 as before. At step 104, the control vector CV(*) is set equal to CV_HIGH(*), OC is set equal to OC_HIGH, and the PINSET(k) element for this particular controlled impedance (CI) 38 is set to 1 so that it will not be further perturbed during the acquisition pass. Control then passes back to step 86 for the next iteration through the k controlled impedance (CI) networks 38.

The following are several optional refinements that may be made to the acquisition stage of the preferred methodology: (1) To save on optimization criterion (OC) evaluations, on the initial iteration, step only in one direction. If the optimization criterion improves by more than some prescribed value, the control value is stepped in this direction. If the optimization criterion diminishes by more than some prescribed value, step the control in the opposite direction. This potentially shortens the time required for acquisition. (2) Force a re-evaluation of the optimization criterion at current value of control variables once per pass through the loop to account for changes over time in the propagation channel. (3) During the acquisition stage the user terminal can transmit the pilot signal at full power (i.e., no accompanying user data signal). After the acquisition stage, the pilot tone power is adjusted sufficiently below that of the user data. A protocol control process is used to provide signaling back to the user terminal for this purpose.

FIGS. 6 (6A/6B) is a flowchart of the preferred method of operating the tracking pass 80 in the adaptation controller 16A, 16B shown in FIGS. 2 and 3. The tracking pass 80 is engaged after the system has looped through NLOOP_ACQ iterations of the acquisition pass 78, at which point it is assumed that the array controlled impedance networks 38 are somewhat stabilized and are providing a relatively good OC value. At this point, the system enters 110 the tracking phase, in which more gradual (or incremental) changes are made to the CV(*) vector values, as opposed to the gross change induced during the acquisition phase 78.

At step 112, the system enters a loop which is iterated NPIN times on the variable "k", just as in the acquisition pass 78 and once for each of the NPIN controlled impedance (CI) 38 networks. After the NPIN iterations have taken place, the system returns 114 to the main control loop at step 74 shown in FIG. 4.

For each of the NPIN controlled impedance (CI) networks 34, the following steps occur each pass through the tracking pass 80. First, several working parameters are initialized, including CV_LOW(*), CV_LOW(k), CV_HIGH(*), and CV_HIGH(k). These parameters have the same meanings as described above with reference to the acquisition pass 78. Initially, CV_LOW(*) is set equal to CV(*) and CV_HIGH (*) is set to CV(*). CV_LOW(k), which is the k-th element of the vector CV_LOW(*) is set equal to CV_LOW(k) minus CV_TRACKING_STEP. In other words, the k-th element of CV(*) minus CV_TRACKING_STEP. CV_TRACKING_STEP is an incremental value over which the k-th control variable will be varied up and down during each pass of the tracking phase. Preferably, this tracking step is a relatively small value, such as 0.05 to 0.1, although other values are certainly possible depending on the normalized range of outputs from the CVO 22. For example, if the output of the CVO 22 is a value from 0 to 10, then CV_TRACKING_STEP may be chose to be 0.5 to 1, whereas if the value output is from 0 to 100, the value may be 5–10. Likewise, CV_HIGH(*) is set equal to CV(*), and CV_HIGH(k) is set equal to CV_HIGH(k) plus CV_TRACKING_STEP. In this manner, the system is iterating the prior CV value for the k-th element of the control vector up and down by the value of the tracking step. These are the two values that will be tested for better OC convergence in the remainder of the tracking algorithm.

Having initialized these working parameters, at step 118 the system determines if CV_LOW(k) is less then LIMIT_LOW, thereby indicating an out-of-bounds condition. If so, then a condition flag (CF_LOW) is set to 0 at step 124 indicating that CV_LOW(k) has been iterated to an improper value. If, however, CV_LOW(k) is not out-of-bounds, then at step 120 the condition flag (CF_LOW) is set to 1 indicating that CV_LOW(k) has been iterated to a proper value, and control passes to step 122. At step 122, the control variables are set according to CV_LOW(*), and the controller 16A, 16B computes the relevant optimization criterion (OC_LOW) based on the CV_LOW(*) vector. Following steps 124 or 122, control passes to step 126.

At step 126, the system then tests whether CV_HIGH(k) is greater than LIMIT_HIGH, thereby indicating an out-of-bounds condition for this parameter. If so, then a condition flag (CF_HIGH) is set to 0 at step 132 indicating that CV_HIGH(k) has been iterated to an improper value. If, however, CV_HIGH(k) is not out-of-bounds, then at step 128 the condition flag (CF_HIGH) is set to 1 indicating that CV_HIGH(k) has been iterated to a proper value, and control passes to step 130. At step 130, the control variables are set according to CV_HIGH(*), it and the controller 16A, 16B computes the relevant optimization criterion (OC HIGH) based on the CV_HIGH(*) vector. Following steps 132 or 130, control passes to step 134.

At step 134, the system then tests whether the condition flag CF_HIGH has been set equal to 1, indicating that CV_HIGH(k) was iterated to a proper value. If not, then control passes to step 142. If so, then control passes to step 136, where the system tests whether the condition flag CF_LOW has been set equal to 1, indicating that CV_LOW(k) was iterated to a proper value. If not, then control passes to step 140. If so, then control passes to step 138. The system will reach step 138 if both the CV_HIGH(k) and CV_LOW(k) parameters were iterated to proper values. In this case, the system tests whether OC_HIGH is greater than OC_LOW (which is an arbitrarily chosen test for determining whether OC_HIGH is a better OC choice than OC_LOW, as discussed above.) If OC_HIGH is greater than OC_LOW, then control passes to step 140, but if OC_HIGH is not greater than OC_LOW, then control passes to step 142.

If the system reaches step 140, then either CV_LOW(k) was iterated to an improper value, or OC_HIGH was the better OC value in comparison to OC_LOW. In any event, at step 140, the system determines whether OC_HIGH is greater than the prior OC value multiplied by some delta (OC_DELTA). This is similar to steps 100, 102 discussed above in the acquisition phase 78, although the value of OC_DELTA may be different in the tracking phase than in the acquisition phase. If OC_HIGH is not greater than the prior OC multiplied by OC_DELTA, then control passes to step 148. If, however, OC_HIGH is greater than the prior OC multiplied by OC_DELTA, then control passes to step 144, where the CV(*) vector is set to CV_HIGH(*), and the current OC variable is set to OC_HIGH. Control then passes to step 148.

If the system reaches step 142, then either CV_HIGH(k) was iterated to an improper value, or OC_LOW was the better OC value in comparison to OC_HIGH . In any event, at step 142, the system determines whether OC_LOW is greater than the prior OC value multiplied by some delta (OC_DELTA). If OC_LOW is not greater than the prior OC multiplied by OC_DELTA, then control passes to step 148. If, however, OC_LOW is greater than the prior OC multiplied by OC_DELTA, then control passes to step 146, where the CV(*) vector is set to CV_LOW(*), and the current OC variable is set to OC_LOW. Control then passes to step 148.

At step 148, the OC_HISTORY parameter is calculated. OC_HISTORY is a tally of the number of times that the OC value failed to exceed a pre-determined threshold (termed OC_THRESHOLD) in the last OC_N_HISTORY iterations through the tracking stage. At step 150, the system determines whether OC_HISTORY has exceeded some predetermined threshold count termed OC_THRESHOLD_COUNT. If not, meaning that the OC value has been consistently acceptable, then control passes back to step 112, and the iterations through the main loop continue. If, however, the threshold is exceeded, then at step 152 the system parameters CV(*), PINSET(*) and ACQ_COUNT are reset to their initial values of 0.5, 0 and 0, respectively. By resetting ACQ_COUNT to 0, the next time through the main loop at step 76 (FIG. 4), the system will reenter the acquisition pass 78, and the acquisition and tracking phases will start over again.

Alternatively, if OC_HISTORY exceeds OC_THRESHOLD_COUNT, the system may progress to step 154, in which case a control vector (CV) that was previously stored in memory 58 will be applied as a new initial condition vector to the array. Although not shown specifically in the flow charts, at any time during the tracking phase, the protocol controller 22 may determine that a particular set of control variables yields a particular good OC value. When this happens, the protocol controller 22 asserts the Store/Apply CV(*) line to the memory 58 and causes the then-existing control vector to be saved into memory. Then, at step 154, the system may apply one or more of these stored control vectors in order to more quickly adapt the array 12 to a set of control variables that yield an acceptable optimization criterion.

The following are several optional refinements that may be made to the acquisition stage of the preferred methodology: (1 ) start with small steps (CV_TRACKING_STEP) and evaluate perturbation (amplitude and phase) of desired signal for each control variable. Use distinct step sizes for each individual control with step size as large as possible without exceeding a maximum allowed desired signal perturbation. This will allow for fast tracking without introducing an unacceptable bit error rate at the output of modem 44, 60. (2) Control variables, when adapted, tend to lie at the limits of their range (i.e., control variables end up as a combination of 1's and 0's). When tracking the time variation of the propagation channel, control variables will swing from one limit to the another. These trends can be detected and optimization accelerated by removing the overhead of testing the optimization criterion along the "swinging" control variables. (3) A conjugate gradients based optimization approach for tracking could be employed to provide faster tracking at the cost of increased complexity. The constraints due to the range limit of the control variables could be accommodated mapping unconstrained control variables (CV') to constrained parasitic control values CV using the equation: CV=cos² [CV'*pi/2].

Figure 7:
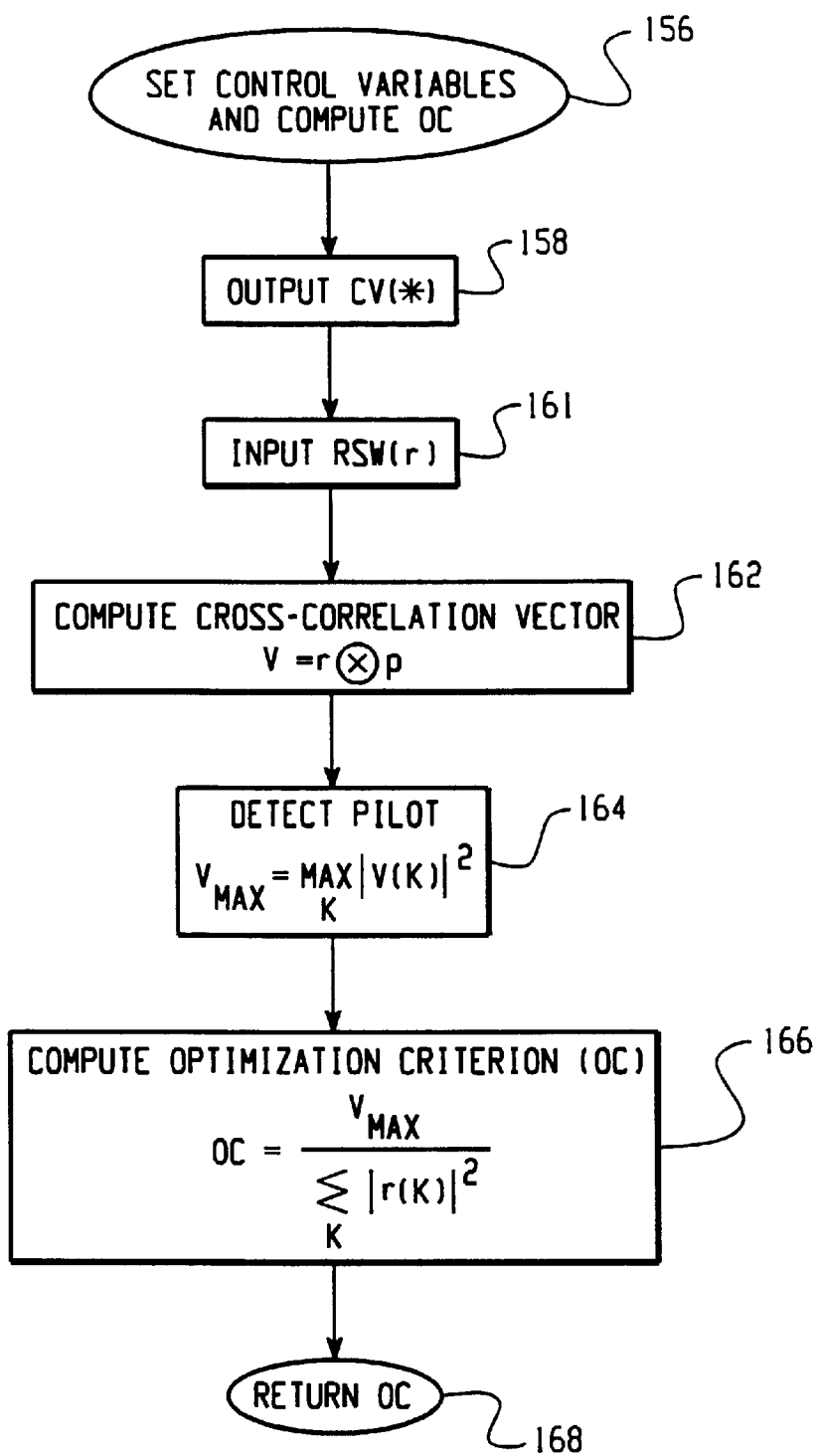
FIG. 7 is a flowchart of the preferred method of calculating the optimization criterion (OC) in the pilot-tone based adaptation controller shown in FIG. 2.

FIG. 7 is a flowchart of the preferred method of calculating the optimization criterion (OC) in the pilot-tone based adaptation controller 16A shown in FIG. 2. The steps shown in FIG. 7 correspond to steps 74, 94 and 96 shown in FIGS. 4 and 5. The method begins at 156. At step 158, the control variables CV(*) (which could be the current values of CV(*) as in step 74, or CV_LOW(*) as in step 94 or CV_HIGH(*) as in step 96) are output to the array 12 and modify the impedance of the CI networks 38.

At step 161, the corresponding received signal waveform (r) is then received from the transceiver module 14. The pilot signal is then detected in steps 162, 164 (which correspond to block 48 in FIG. 2), by first computing a cross correlation vector V(*)=r cross p, where p is a pilot signal mask for the desired communication node 10A, in step 162, and then detecting the pilot at step 164 by finding the maximum of the magnitude squared of V(*). This $V_{MAX}$ value then indicates the strength of the pilot signal received from communication node 10A.

Having detected the pilot signal, and determined its $V_{MAX}$ value, the optimization criterion OC is then computed (in the compute optimization criterion block 52) by dividing the $V_{MAX}$ value by the summation (over the k data points) of the magnitude squared of the received signal waveform at the k data points (samples). At step 168, this OC value is then returned to the system, where it is supplied to the control variable optimizer 20.

Figure 8:
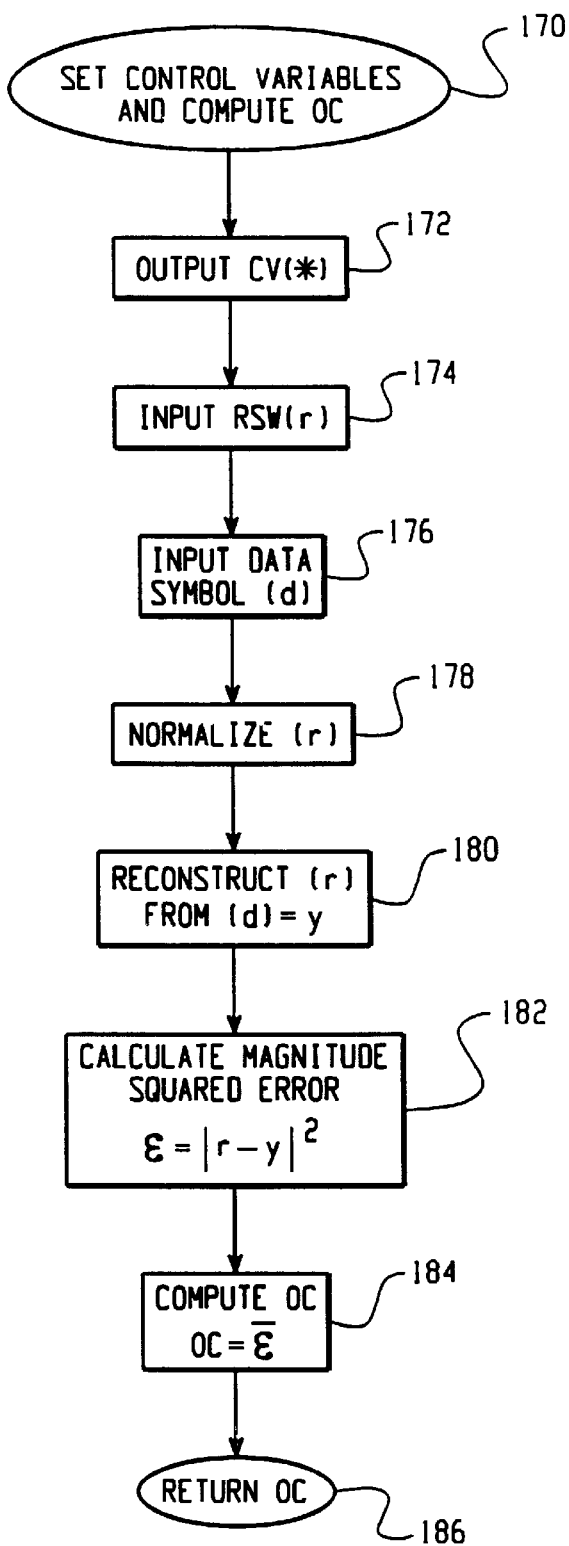
FIG. 8 is a flowchart of the preferred method of calculating the optimization criterion (OC) in the decision-directed based adaptation controller shown in FIG. 3.

FIG. 8 is a flowchart of the preferred method of calculating the optimization criterion (OC) in the decision-directed based adaptation controller 16B shown in FIG. 3. The steps shown in FIG. 8 correspond to steps 74, 122 and 130 shown in FIGS. 4 and 6. The method begins at 170. At step 172, the control variables CV(*) (which could be the current values of CV(*) as in step 74, or CV_LOW(*) as in step 122 or CV_HIGH(*) as in step 130) are output to the array 12 and modify the impedance of the CI networks 38.

At step 174, the corresponding received signal waveform (r) is then received from the transceiver module 14. At step 176, the corresponding demodulated data symbols (d) are then received from the digital modem 60.

At step 178, the received signal waveform (r) is then normalized, as shown in block 62. At step 180, an estimate of the waveform (r), termed "y", is then reconstructed from the received data symbols (d), as shown in block 64. The reconstructed waveform (y) is an estimation of what the waveform (r) would look like in the absence of any interference or noise. At step 182, the optimization criterion is then computed as in block 66, by calculating the magnitude squared error of (r) minus (y), termed ε. At step 184, the average value of ε is then calculated as in block 68 and set as the OC value. At step 186, this OC value is then returned to the system, where it is supplied to the control variable optimizer 20.

Figure 9:
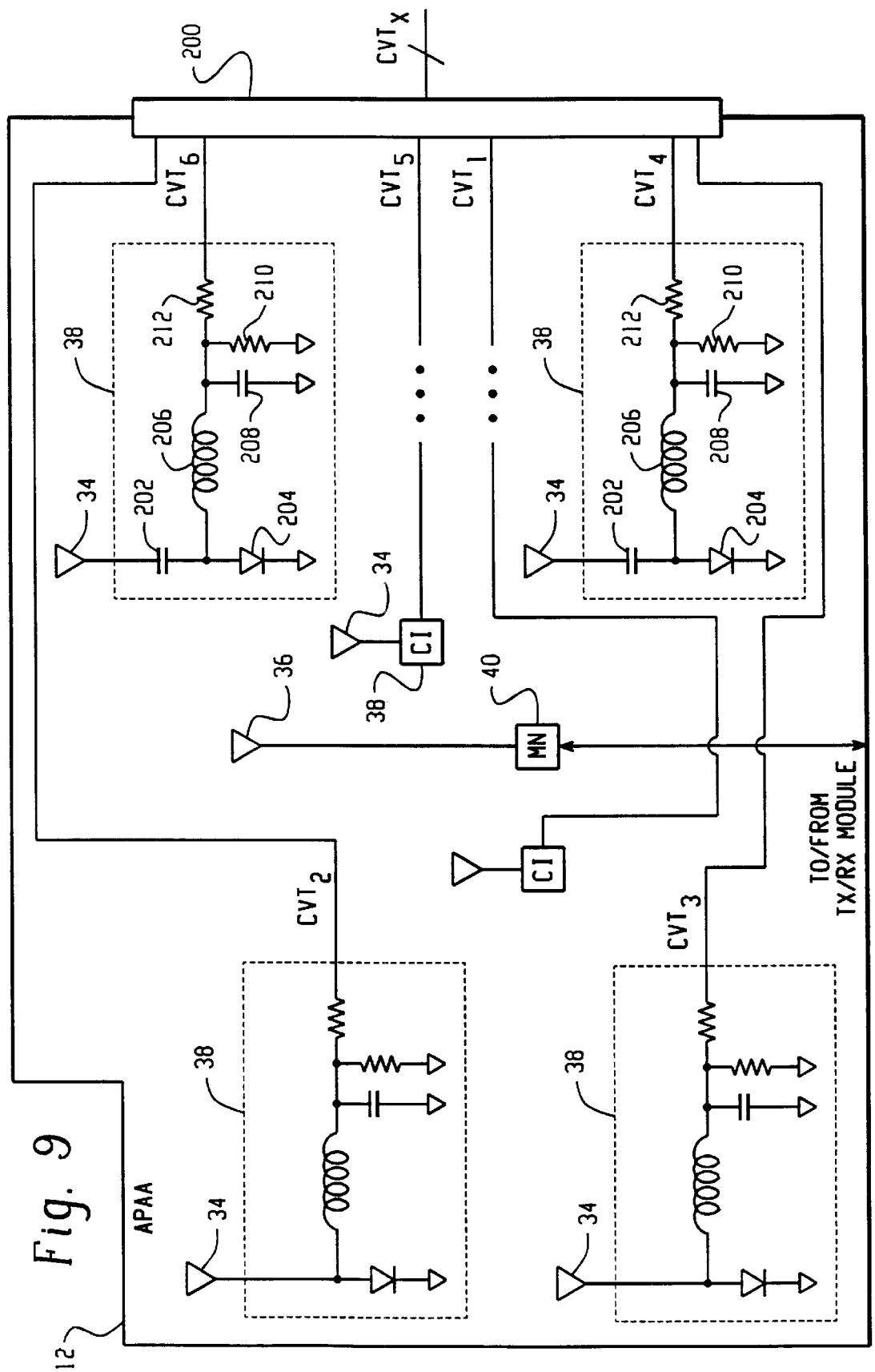
FIG. 9 is an electrical schematic of the preferred controlled impedance (CI) networks coupled to the parasitic elements of the adaptive parasitic array antenna.

FIG. 9 is an electrical schematic of the preferred controlled impedance (CI) networks 38 coupled to the parasitic elements 34 of the adaptive parasitic array antenna 12. Each of the parasitic antennas 34 is coupled to one of the controlled impedance (CI) networks 38. The active (driven) element 36 may be coupled to a matching network (MN) 40, and from there to the transceiver module 14. Each of the controlled impedance (CI) networks 38 are coupled to a respective control voltage $CVT_x$ through a connector 200.

Preferably, the controlled impedance networks (CI) 38 include a resistive divider circuit 212, 210 coupled between the control voltage input and ground, a filtering capacitor 208 coupled between the midpoint of the resistive divider circuit and ground, a blocking inductor 206, a capacitor 202, and a variable impedance device 204, such as a PIN diode. The resistive divider 212, 210 alters the bias level of the control voltage to a level that is compatible with the variable reactance device 204. The capacitor 208 operates as a low pass filter in combination with the resistive divider circuit 210, 212. The inductor 206 prevents RF energy from being transmitted back onto the control voltage inputs. And the capacitor 202 operates as a matching device.

The main element of the CI network 38 is the variable impedance device 204. Preferably, this device 204 is a PIN diode. As the voltage level $CVT_x$ input to the network 38 varies, the voltage across the variable impedance device 204 will vary, and hence the impedance (or RF loading) seen by the parasitic antenna element 34 will vary. Preferably, the loading may vary between several ohms and several thousand ohms. As the RF loading of the parasitic antenna element 34 changes, so does the mutual coupling between the parasitic element 34 and the active element 36. Thus, by altering the voltage level $CVT_x$ input to the CI network 38, the portion of the beampattern that is associated with the mutual coupling between the particular parasitic element 34 and the active element 36 is altered.

Figure 10:
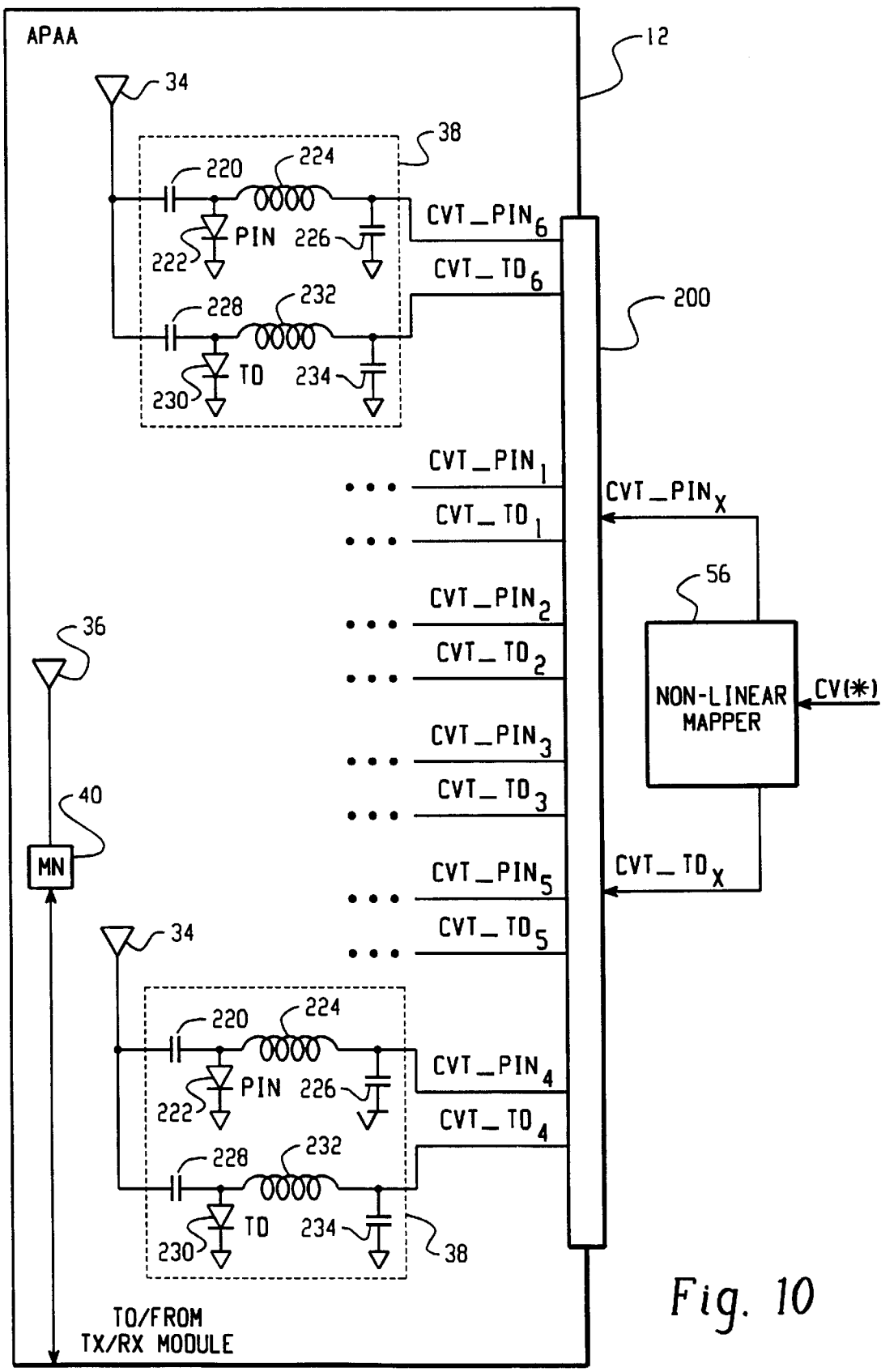
FIG. 10 is an electrical schematic of alternative controlled impedance (CI) networks in which a negative resistance device is used in combination with a reactive device in order to extend the beamforming capabilities of the antenna system.

FIG. 10 is an electrical schematic of alternative controlled impedance (CI) networks 38 in which a negative resistance device 230 (TD) is used in combination with a impedance device 222 (PIN) in order to extend the beamforming capabilities of the antenna system. Because there are two variable devices in the CI network 38 shown in FIG. 10, there needs to be two control voltages, one for the impedance device (PIN), and one for the negative resistance device (TD). The control voltage for the PIN diode is termed $CVT\_PIN_x$, and the control voltage for the negative resistance device is termed $CVT\_TD_x$.

Preferably, the negative resistance device 230 is a tunnel diode. Tunnel diodes are characterized by an I—V characteristic that includes a small range of forward bias voltages over which as the voltage applied increases, the current through the device actually decreases, hence providing the negative resistance behavior.

Because the characteristic of the tunnel diode 230 is non-linear, the control variables CV(*) are input to a non-linear mapper circuit 56, which maps the single control variable element CV(k) to a pair of control voltages $CVT\_PIN_x$ and $CVT\_TD_x$ for each controlled impedance (CI) network 38. Each of these pairs of voltages is then applied to the respective CI network 38 through the connector 200. The configuration of the CI network 38 is similar to that described above in FIG. 9, except there are two branches to the network 38 instead of one, one branch for each of the devices 222, 230.

The control voltages are fed through an LC circuit 226, 224, which operates as a filter, and prevents RF energy from being transmitted back onto the control voltage inputs. The voltages are then applied to the devices 222, 230, and matched by capacitor 220, 228, before being joined and connected to the parasitic antenna element 34. From the parasitic element's perspective, the RF loading consists of the parallel combination of the PIN diode 22 and the tunnel diode 230. As described above, as the control voltages $CVT\_PIN_x$ and $CVT\_TD_x$ are changed, the RF loading of the PIN diode 222 and tunnel diode 230 change, thereby altering the mutual coupling between the parasitic element 34 and the active element 36. By using the tunnel diode in combination with the PIN diode, the range of loadings presented to the parasitic element 34 can be extended to cover from several thousand ohms (relying on the PIN diode's resistance), to several negative hundred ohms (relying on the tunnel diode's negative resistance.)

The use of tunnel diodes provides several advantages. First, the extended range permits more complex beampatterns to be formed by the array 12. Second, the effective weights associated with the parasitic elements 34 may then extend over a much wider range including exceeding unity. Essentially this provides additional gain for the array. It also allows placing the tunnel diode controlled parasitic elements 34 farther from the active element 36 providing for additional spatial de-correlation. Wider separation would also allow for the use of many more elements in the array 12.

The following lists includes several optional refinements that may be implemented into the overall adaptive parasitic antenna array system: (1) if the transmit data rates are sufficiently high such that the system is operating in a wideband fashion, a wideband PN code, with the same bandwidth as the communication bearing signal, could be used as the pilot signal. On correlating for pilot extraction, optimum diversity combining of correlation lags (i.e., RAKE combining) can be employed to improve performance. (2) If time-domain duplexing (TDD) is employed, then during transmit, the parasitic array impedance controls are set as determined during receive optimization. (3) If TDD is employed and parasitic arrays are employed at both ends of the link they can be adapted jointly in both transmit and receive. (4) If the acquisition stage does not result in an acceptable optimization criterion value, the control values for the transmitting parasitic array can be perturbed and the acquisition stage repeated. This condition could be indicated to the transmitting station implicitly by its not receiving an "acquisition completed OK" acknowledgement from the receiving station within a time-out interval. (5) If a close spacing between the parasitic elements and the active element are used and especially if tunnel diodes are employed in the CI networks then as the control variables (CV) are varied, the impedance at the active element will vary. To minimize the impact of this, the matching network (MN) 40 can be of an electronically adjustable design. In this way, as the control variables are changed, the matching network can be adjusted as to keep the active element, as seen by the TX/RX module 14, matched to the required impedance as much as possible.

The preferred embodiments described with reference to the drawing figures are presented only to demonstrate an example of the invention. Other elements, steps, methods and techniques that are insubstantially different from those described herein are also within the scope of the invention.

I claim:

1. An antenna system, comprising:

an array antenna for generating a beam pattern, the array antenna comprising at least one active element and a plurality of parasitic elements, wherein the active element is coupled to a transceiver for transmitting and receiving data signals, and the parasitic elements are coupled to controlled impedance networks; and an adaptation controller coupled to the transceiver and the array antenna for extracting content information from the received data signals and altering the impedance of the controlled impedance networks in order to adapt the beam pattern of the array antenna, wherein the content information includes a pilot tone signal contained within the received data signals.

2. The antenna system of claim 1, wherein the adaptation controller comprises:

an optimization criterion computation module for computing an optimization criterion based upon the content information of the received data signals; and a control variable optimizer for computing a plurality of control variables based upon the optimization criterion, wherein the control variables are coupled to the controlled impedance networks.

3. The antenna system of claim 2, wherein the adaptation controller further comprises:

a protocol controller for managing the operation of the optimization criterion computation module and the control variable optimizer.

4. The antenna system of claim 3, wherein the control variables alter the impedance of the controlled impedance networks.

5. An antenna system, comprising:

an array antenna for generating a beam pattern, the array antenna comprising at least one active element and a plurality of parasitic elements, wherein the active element is coupled to a transceiver for transmitting and receiving data signals, and the parasitic elements are coupled to controlled impedance networks, wherein the beam pattern of the array antenna is continuously adapted based upon the content information in the received data signal, and wherein the transceiver includes a digital modem for extracting a plurality of data symbols from the received data signals; and an adaptation controller coupled to the transceiver and the array antenna for extracting content information from the received data signals and altering the impedance of the controlled impedance networks in order to adapt the beam pattern of the array antenna, wherein the adaptation controller computes an optimization criterion based upon the content information of the received data signal and continuously generates a plurality of control variables for altering the impedance of the controlled impedance networks, wherein the adaptation controller further comprises:

a normalization circuit coupled to the received data signals for computing a normalized received data signal;

a reconstruction circuit coupled to the plurality of data symbols for computing a reconstructed received data signal from the plurality of data symbols;

an optimization criterion computation module for computing the optimization criterion by comparing the normalized received data signal and the reconstructed received data signal; and a control variable optimizer for generating the plurality of control variables based upon the optimization criterion.

6. The antenna system of claim 1, wherein the content information further includes a plurality of data symbols contained within the received data signals.

7. The antenna system of claim 2, wherein the adaptation controller further comprises a memory for storing a plurality of sets of control variables.

8. The antenna system of claim 2, wherein the adaptation controller further comprises a non-linear mapper coupled between the control variables and the controlled impedance networks.

9. The antenna system of claim 1, wherein the array antenna further comprises a matching network coupled to the active element.

10. The antenna system of claim 2, wherein the optimization criterion is signal to noise ratio (SNR).

11. The antenna system of claim 2, wherein the optimization criterion is signal to interference plus noise ratio (SINR).

12. The antenna system of claim 2, wherein the optimization criterion is bit error rate (BER).

13. The antenna system of claim 2, wherein the control variable optimizer computes a control variable for each of the parasitic elements of the array antenna.

14. The antenna system of claim 13, wherein the control variables are normalized.

15. The antenna system of claim 2, wherein the control variables represent a voltage level that is coupled to the controlled impedance networks in order to alter the impedance of the networks.

16. The antenna system of claim 3, wherein the protocol controller is further coupled to the transceiver for transmitting control information to another antenna system.

17. The antenna system of claim 1, wherein the beam pattern of the array antenna is continuously adapted based upon the content information in the received data signal.

18. The antenna system of claim 17, wherein the adaptation controller computes an optimization criterion based upon the content information of the received data signal and continuously generates a plurality of control variables for altering the impedance of the controlled impedance networks.

19. The antenna system of claim 1, wherein the controlled impedance networks each include a PIN diode.

20. The antenna system of claim 1, wherein the controlled impedance networks each include a negative resistance device.

21. The antenna system of claim 20, wherein the negative resistance device is a tunnel diode.

22. The antenna system of claim 1, wherein the controlled impedance networks each include a PIN diode and a tunnel diode.

23. The antenna system of claim 1, wherein the plurality of parasitic elements include between 6 and 32 parasitic elements.

24. The antenna system of claim 1, wherein the active element and the plurality of parasitic elements are mounted on a planar structure in which the active element is mounted in the center of the planar structure and the plurality of parasitic elements are mounted in a geographic pattern around the active element.

25. An antenna system, comprising:
   an array antenna for generating a beam pattern, the array antenna comprising at least one active element and a plurality of parasitic elements, wherein the active element is coupled to a transceiver for transmitting and receiving data signals, and the parasitic elements are coupled to controlled impedance networks, wherein the beam pattern of the array antenna is continuously adapted based upon the content information in the received data signal; and
   an adaptation controller coupled to the transceiver and the array antenna for extracting content information from the received data signals and altering the impedance of the controlled impedance networks in order to adapt the beam pattern of the array antenna, wherein the adaptation controller computes an optimization criterion based upon the content information of the received data signal and continuously generates a plurality of control variables for altering the impedance of the controlled impedance networks, and wherein the content information includes a pilot tone signal contained within the received data signals.

26. The antenna system of claim 19, wherein the content information further includes a plurality of data symbols contained within the received data signal.

27. The antenna system of claim 26, wherein the transceiver includes a digital modem for extracting a plurality of data symbols from the received data signals.

28. The antenna system of claim 25, wherein the adaptation controller further comprises a memory for storing a plurality of sets of control variables.

29. The antenna system of claim 25, wherein the adaptation controller further comprises a non-linear mapper coupled between the control variables and the controlled impedance networks.

30. The antenna system of claim 25, wherein the array antenna further comprises a matching network coupled to the active element.

31. The antenna system of claim 25, wherein the optimization criterion is signal to noise ratio (SNR).

32. The antenna system of claim 25, wherein the optimization criterion is signal plus interference to noise ratio (SINR).

33. The antenna system of claim 25, wherein the optimization criterion is bit error rate (BER).

34. The antenna system of claim 25, wherein the control variables are normalized.

35. The antenna system of claim 25, wherein the control variables represent a voltage level that is coupled to the controlled impedance networks in order to alter the impedance of the networks.

36. The antenna system of claim 25, wherein the adaptation controller comprises:
   a pilot tone detector for extracting the pilot tone signal from the received data signals;
   an optimization criterion computation module for computing the optimization criterion based upon the pilot tone signal; and
   a control variable optimizer for generating the plurality of control variables based upon the optimization criterion.

37. The antenna system of claim 36, wherein the adaptation controller further comprises:
   a memory for storing a plurality of sets of control variables.

38. The antenna system of claim 36, wherein the adaptation controller further comprises:
   a non-linear mapper coupled between the plurality of control variables and the controlled impedance networks.

39. The antenna system of claim 36, wherein the adaptation controller further comprises:
   a pilot tone signal generator for generating a pilot tone signal; and
   a protocol controller coupled to the transceiver and the pilot tone signal generator for controlling when the pilot tone signal is transmitted from the array antenna.

40. The antenna system of claim 39, wherein the transceiver further comprises:
   an RF/baseband converter;
   a mixer; and
   a modem.

41. The antenna system of claim 39, wherein the protocol controller inhibits the control variable optimizer when the system is transmitting.

42. The antenna system of claim 40, wherein the mixer is coupled to a transmit data signal and the pilot tone signal and generates a mixed signal.

43. The antenna system of claim 40, wherein the adaptation controller operates in two modes, an acquisition mode and a tracking mode, and wherein the protocol controller mutes the modem of the transceiver when the adaptation controller is in acquisition mode.

44. The antenna system of claim 42, wherein the pilot tone signal is continuously added to the transmit data signal.

45. The antenna system of claim 42, wherein the transmitter alternates between transmitting the transmit data signal and the pilot tone signal.

46. The antenna system of claim 25, wherein the pilot tone signal is a pseudo-random noise sequence.

47. The antenna system of claim 5, wherein the adaptation controller further comprises:
   a non-linear mapper coupled between the plurality of control variables and the controlled impedance networks.

48. The antenna system of claim 5, wherein the adaptation controller operates in two modes, an acquisition mode and a tracking mode.

49. The antenna system of claim 5, wherein the adaptation controller further comprises:
   a memory for storing a plurality of sets of control variables.

50. A method of operating an array antenna having at least one active element and a plurality of parasitic elements, the method comprising the steps of:
   (A) providing a plurality of controlled impedance networks coupled to each of the parasitic elements;
   (B) receiving a data signal at the array antenna;
   (C) extracting content information from the received data signal, wherein step (C) further comprises the step of extracting a pilot tone signal from the received data signal; and
   (D) altering the impedance of the controlled impedance networks based upon the content information so as to adapt the beam pattern of the array antenna.

51. The method of claim 24, wherein step (D) further comprises the steps of:
   (D)(i) computing an optimization criterion based upon the content information of the received data signals;
   (D)(ii) computing a plurality of control variables based upon the optimization criterion; and
   (D)(iii) applying the control variables to the controlled impedance networks.

52. The method of claim 51, wherein the control variables alter the impedance of the controlled impedance networks.

53. The method of claim 51, further comprising the step of storing a plurality of sets of control variables in a memory.

54. The method of claim 53, further comprising the steps of:
   determining whether the beam pattern of the array antenna can be adapted to a predetermined threshold level; and
   if not, then obtaining a set of control variables from the memory and applying these control variables to the controlled impedance networks.

55. The method of claim 51, wherein step (D) further comprises the step of:
   (D)(iv) applying a non-linear mapping to the control variables.

56. A method of operating an array antenna having at least one active element and a plurality of parasitic elements, the method comprising the steps of:
   (A) providing a plurality of controlled impedance networks coupled to each of the parasitic elements;
   (B) receiving a data signal at the array antenna;
   (C) extracting content information from the received data signal, wherein step (C) further comprises the steps of:
   (C)(i) normalizing the received data signal;
   (C)(ii) generating a reconstructed data signal from the received data signal; and
   (C)(iii) comparing the normalized received data signal to the reconstructed data signal; and
   (D) altering the impedance of the controlled impedance networks based upon the content information so as to adapt the beam pattern of the array antenna.

57. A system, comprising:
   an array antenna having an active element and a plurality of parasitic elements, wherein each of the parasitic elements is coupled to a controlled impedance network; and
   a controller that receives a data signal from the array antenna and alters the impedance of the controlled impedance networks based upon the content of the data signal, wherein the data signal includes a pilot tone.

58. The system of claim 57, wherein the array antenna generates a beam pattern, and wherein the controller alters the impedance of the controlled impedance networks in order to adapt the beam pattern of the array antenna.

59. The system of claim 58, wherein the beam pattern of the array antenna is continuously adapted based upon the content of the received data signal.

60. The system of claim 59, wherein the controller computes an optimization criterion based upon the content of the received data signal and continuously generates a plurality of control variables for altering the impedance of the controlled impedance networks.

61. The system of claim 59, wherein the controller further comprises a memory for storing the control variables.

62. The system of claim 59, wherein the controller further comprises a non-linear mapper circuit.

63. The system of claim 59, wherein the array antenna further comprises a matching network coupled to the active element.

64. The system of claim 59, wherein the optimization criterion is signal to noise ratio (SNR).

65. The system of claim 59, wherein the optimization criterion is signal to interference plus noise ratio (SINR).

66. The system of claim 59, wherein the optimization criterion is bit error rate (BER).

67. The system of claim 59, wherein the control variables are normalized.

68. The system of claim 59, wherein the control variables provide a voltage level that alters the impedance of the controlled impedance networks.

69. The system of claim 57, further comprising:
   a receiver coupled to the active element in order to receive a data signal.

70. The system of claim 57, further comprising:
   a transceiver coupled to the active element in order to receive a data signal and also to transmit a data signal.

71. The system of claim 70, further comprising a protocol controller coupled to the transceiver for transmitting control information to another system.

72. The system of claim 57, wherein the controller comprises:
   an optimization circuit for generating an optimization criterion based upon the content of the received data signal; and
   a control variable circuit for generating a plurality of control variables based upon the optimization criterion, wherein the control variables are coupled to the controlled impedance networks.

73. The system of claim 72, wherein the controller further comprises:
   a protocol circuit for managing the operation of the optimization circuit and the control variable circuit.

74. The system of claim 73, wherein the control variables alter the impedance of the controlled impedance networks.

75. The system of claim 72, wherein the controller further comprises a memory for storing the control variables.

76. The system of claim 72, wherein the controller further comprises a non-linear mapper circuit.

77. The system of claim 72, wherein the optimization criterion is signal to noise ratio (SNR).

78. The system of claim 72, wherein the optimization criterion is signal to interference plus noise ratio (SINR).

79. The system of claim 72, wherein the optimization criterion is bit error rate (BER).

80. The system of claim 72, wherein the control variable circuit computes a control variable for each of the parasitic elements of the array antenna.

81. The system of claim 80, wherein the control variables are normalized.

82. The system of claim 72, wherein the control variables provide a voltage level to alter the impedance of the controlled impedance networks.

83. The system of claim 57, wherein the content of the data signal includes a plurality of digital data symbols.

84. The system of claim 57, wherein the array antenna further comprises a matching network coupled to the active element.

85. The system of claim 84, wherein the matching network is adjustable.

86. The system of claim 57, wherein the controlled impedance networks each include a PIN diode.

87. The system of claim 57, wherein the controlled impedance networks each include a negative resistance device.

88. The system of claim 87, wherein the negative resistance device is a tunnel diode.

89. The system of claim 57, wherein the controlled impedance networks each include a PIN diode and a tunnel diode.

90. The system of claim 57, wherein the plurality of parasitic elements include between 6 and 32 parasitic elements.

91. The system of claim 57, wherein the active element and the plurality of parasitic elements are mounted on a planar structure in which the active element is mounted in the center of the planar structure and the plurality of parasitic elements are mounted in a geographic pattern around the active element.

92. A system, comprising:
an array antenna having an active element and a plurality of parasitic elements, wherein each of the parasitic elements is coupled to a controlled impedance network; and
a controller that receives a data signal from the array antenna and alters the impedance of the controlled impedance networks based upon the content of the data signal;
wherein the array antenna generates a beam pattern, and wherein the controller alters the impedance of the controlled impedance networks in order to adapt the beam pattern of the array antenna, wherein the beam pattern of the array antenna is continuously adapted based upon the content of the received data signal, and wherein the content includes a pilot tone signal contained within the received data signals.

93. The system of claim 92, wherein the content includes a plurality of data symbols contained within the received data signals.

94. The system of claim 93, further comprising a transceiver having a digital modem for extracting a plurality of data symbols from the received data signal.

95. The system of claim 94, wherein the controller further comprises:
a normalization circuit coupled to the received data signals for computing a normalized received data signal;
a reconstruction circuit coupled to the plurality of data symbols for computing a reconstructed received data signal from the plurality of data symbols;
an optimization criterion computation module for computing the optimization criterion by comparing the normalized received data signal and the reconstructed received data signal; and
a control variable optimizer for generating the plurality of control variables based upon the optimization criterion.

96. The system of claim 95, wherein the controller further comprises:
a memory for storing a plurality of sets of control variables.

97. The system of claim 95, wherein the controller further comprises:
a non-linear mapper coupled between the plurality of control variables and the controlled impedance networks.

98. The system of claim 95, wherein the controller operates in two modes, an acquisition mode and a tracking mode.

99. The system of claim 92, wherein the controller comprises:
a pilot tone detector for extracting the pilot tone signal from the received data signals;
an optimization criterion circuit for computing the optimization criterion based upon the pilot tone signal; and
a control variable optimizer for generating the plurality of control variables based upon the optimization criterion.

100. The system of claim 99, wherein the controller further comprises:
a memory for storing a plurality of sets of control variables.

101. The system of claim 99, wherein the controller further comprises:
a non-linear mapper circuit for generating a plurality of non-linear control variables.

102. The system of claim 99, wherein the controller further comprises:
a pilot tone signal generator for generating a pilot tone signal; and
a protocol controller coupled to a transceiver and the pilot tone signal generator for controlling when a pilot tone signal is transmitted from the array antenna.

103. The system of claim 102, wherein the transceiver further comprises:
an RF/baseband converter;
a mixer; and
a modem.

104. The system of claim 103, wherein the mixer is coupled to a transmit data signal and the pilot tone signal and generates a mixed signal.

105. The system of claim 103, wherein the controller operates in two modes, an acquisition mode and a tracking mode, and wherein the protocol controller mutes the modem of the transceiver when the controller is in acquisition mode.

106. The system of claim 103, wherein the protocol controller inhibits the control variable optimizer when the system is transmitting.

107. The system of claim 104, wherein the pilot tone signal is continuously added to the transmit data signal.

108. The system of claim 104, wherein the transmitter alternates between transmitting the transmit data signal and the pilot tone signal.

109. The system of claim 92, wherein the pilot tone signal is a pseudo-random noise sequence.

110. A pilot-tone based adaptive array antenna system, comprising:

an array antenna having at least one active element and a plurality of parasitic elements, wherein each of the plurality of parasitic elements is terminated with a controlled impedance network;

a transceiver coupled to the active element for received a data signal from the array antenna and for transmitting a data signal to the array antenna; and an adaptation controller coupled between the transceiver and the plurality of parasitic elements, wherein the adaptation controller comprises:

an optimization criterion computation module for extracting a pilot tone signal from the received data signal and for generating an optimization criterion; and a control variable optimizer for generating a set of control variables based upon the optimization criterion, wherein the control variables are applied to the controlled impedance networks in order to adapt the beam pattern of the array antenna.

111. A decision-directed based adaptive array antenna system, comprising:

an array antenna having at least one active element and a plurality of parasitic elements, wherein each of the plurality of parasitic elements is terminated with a controlled impedance network;

a transceiver coupled to the active element for received a data signal from the array antenna and for transmitting a data signal to the array antenna; and an adaptation controller coupled between the transceiver and the plurality of parasitic elements, wherein the adaptation controller comprises:

an optimization criterion computation module for generating an optimization criterion by comparing the received data signal with a reconstructed version of the received data signal; and a control variable optimizer for generating a set of control variables based upon the optimization criterion, wherein the control variables are applied to the controlled impedance networks in order to adapt the beam pattern of the array antenna.

* * * * *